US012736378B2

(12) United States Patent
Senriuchi et al.

(10) Patent No.: US 12,736,378 B2
(45) Date of Patent: Sep. 15, 2026

(54) ELEMENT ARRAY CIRCUIT, ELEMENT ARRAY CIRCUIT UNIT, ELECTROMAGNETIC WAVE SENSOR, TEMPERATURE SENSOR, AND STRAIN SENSOR

(71) Applicant: TDK CORPORATION, Tokyo (JP)

(72) Inventors: Tadao Senriuchi, Tokyo (JP); Shinji Hara, Tokyo (JP); Susumu Aoki, Tokyo (JP); Naoki Ohta, Tokyo (JP)

(73) Assignee: TDK CORPORATION, Tokyo (JP)

( * ) Notice: Subject to any disclaimer, the term of this patent is extended or adjusted under 35 U.S.C. 154(b) by 384 days.

(21) Appl. No.: 18/592,825

(22) Filed: Mar. 1, 2024

(65) Prior Publication Data

US 2024/0310194 A1 Sep. 19, 2024

(30) Foreign Application Priority Data

Mar. 15, 2023 (JP) ................................ 2023-040366

(51) Int. Cl.

*G01D 21/02* (2006.01)
*G01J 5/03* (2022.01)
*G01K 7/16* (2006.01)
*G01L 1/22* (2006.01)

(52) U.S. Cl.

CPC ................ *G01D 21/02* (2013.01); *G01J 5/03* (2022.01); *G01K 7/16* (2013.01); *G01L 1/225* (2013.01)

(58) Field of Classification Search

CPC .... G01D 21/02; G01J 5/03; G01J 5/24; G01J 5/22; G01J 2005/0077; G01K 7/16; G01L 1/255; G01L 1/205; G01L 1/225

See application file for complete search history.

(56) References Cited

U.S. PATENT DOCUMENTS

2021/0072108 A1* 3/2021 Numata .................. G01L 1/225
2024/0310194 A1* 9/2024 Senriuchi ................ G01L 1/205

FOREIGN PATENT DOCUMENTS

JP H08-94443 A 4/1996

* cited by examiner

*Primary Examiner* — Randy W Gibson
(74) *Attorney, Agent, or Firm* — Oliff PLC

(57) ABSTRACT

An element array circuit includes first wirings including respective first parts, second wirings including respective second parts, and impedance elements each coupled to both one of the first wirings and one of the second wirings. The second parts extend in a direction different from that in which the first parts extend. Each of the second wirings includes a readout line through which signals flow, the signals indicating states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. The first parts are smaller than the second parts in electrical resistance value per unit length.

13 Claims, 19 Drawing Sheets

ELEMENT ARRAY CIRCUIT, ELEMENT ARRAY CIRCUIT UNIT, ELECTROMAGNETIC WAVE SENSOR, TEMPERATURE SENSOR, AND STRAIN SENSOR

CROSS-REFERENCE TO RELATED APPLICATIONS

The present application claims priority from Japanese Patent Application No. 2023-040366 filed on Mar. 15, 2023, the entire contents of which are hereby incorporated by reference.

BACKGROUND

The disclosure relates to an element array circuit including impedance elements, and to an element array circuit unit, an electromagnetic wave sensor, a temperature sensor, and a strain sensor each including the element array circuit.

A resistor array circuit has been proposed that includes resistors arranged in a matrix. Such a resistor array circuit is usable, for example, as an infrared detection circuit. For example, reference is made to Japanese Unexamined Patent Application Publication (JP-A) No. H08-94443. Such an infrared detection circuit includes infrared-sensitive resistors arranged therein. Examples of the infrared-sensitive resistors may include a thermistor whose electrical resistance value changes with changing temperature.

SUMMARY

An element array circuit according to an embodiment of the disclosure includes first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts.

An element array circuit unit according to an embodiment of the disclosure includes element array circuits. The element array circuits each include first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts. The element array circuits are disposed side by side in the direction in which each of the first parts extends.

An electromagnetic wave sensor according to an embodiment of the disclosure includes an element array circuit. The element array circuit includes first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts.

An electromagnetic wave sensor according to an embodiment of the disclosure includes an element array circuit unit. The element array circuit unit includes element array circuits. The element array circuits each include first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts. The element array circuits are disposed side by side in the direction in which each of the first parts extends.

A temperature sensor according to an embodiment of the disclosure includes an element array circuit. The element array circuit includes first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts.

A temperature sensor according to an embodiment of the disclosure includes an element array circuit unit. The element array circuit unit includes element array circuits. The element array circuits each include first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts. The element array circuits are disposed side by side in the direction in which each of the first parts extends.

A strain sensor according to an embodiment of the disclosure includes an element array circuit. The element array circuit includes first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts.

A strain sensor according to an embodiment of the disclosure includes an element array circuit unit. The element array circuit unit includes element array circuits. The element array circuits each include first wirings, second wirings, and impedance elements. The first wirings each include a first part. The second wirings each include a second part. The respective second parts of the second wirings each extend in a direction different from a direction in which the respective first parts of the first wirings each extend. The impedance elements are each coupled to both one of the first wirings and one of the second wirings. Each of the second wirings includes a readout line through which signals flow, the signals indicating respective states of multiple ones of the impedance elements coupled to relevant one of the second wirings. Each of the first parts is a part, of relevant one of the first wirings, to which multiple ones of the impedance elements are coupled. Each of the second parts is a part, of relevant one of the second wirings, to which multiple ones of the impedance elements are coupled. Each of the first parts has an electrical resistance value per unit length smaller than an electrical resistance value per unit length of each of the second parts. The element array circuits are disposed side by side in the direction in which each of the first parts extends.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
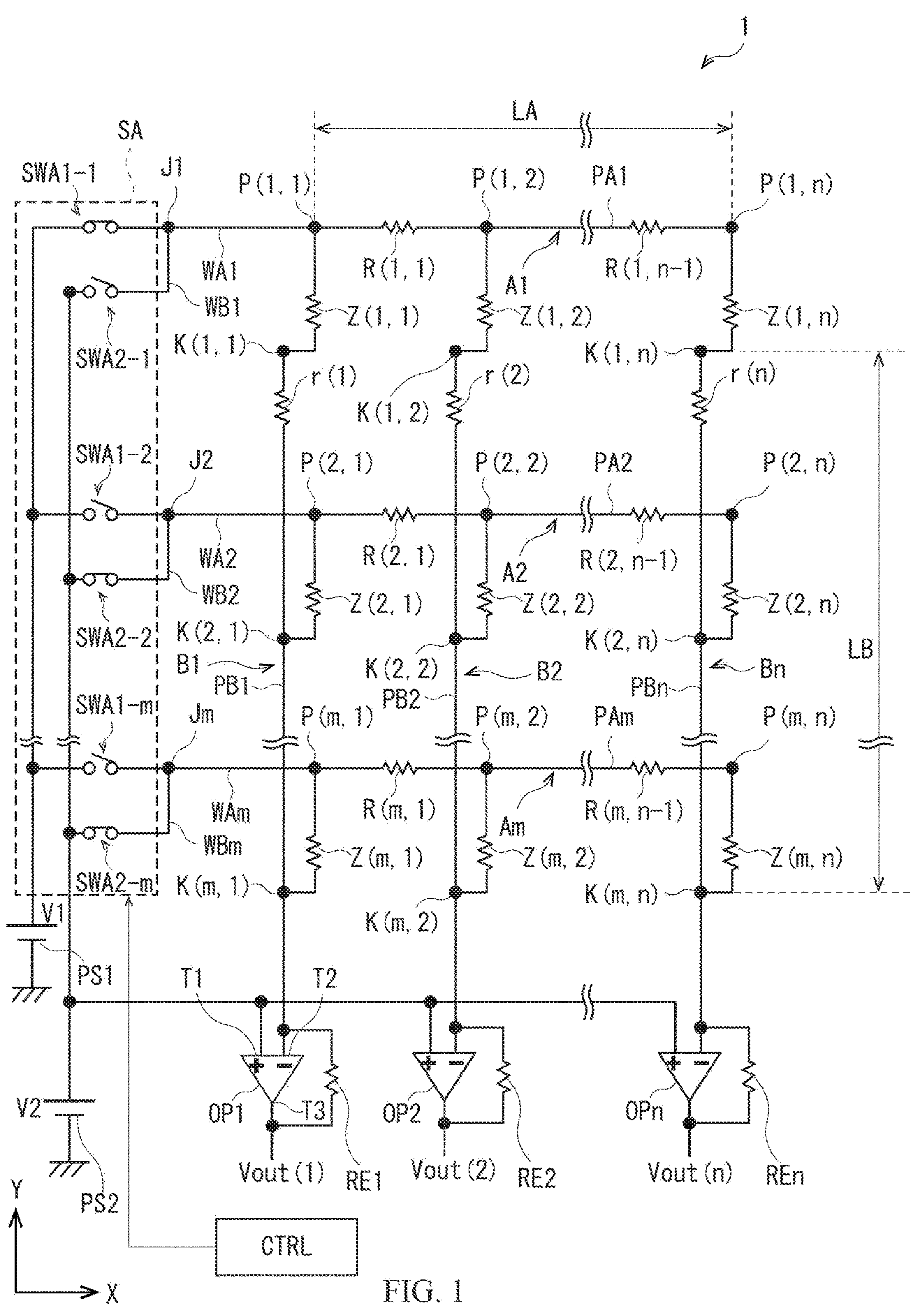
FIG. 1 is a circuit diagram illustrating a configuration example of an element array circuit according to one example embodiment of the disclosure.

It is desirable that an element array circuit such as an infrared detection circuit acquire a measured value related to, for example, an electrical resistance value, with high accuracy.

It is desirable to provide an element array circuit that makes it possible to acquire a measured value with high accuracy, and an element array circuit unit, an electromagnetic wave sensor, a temperature sensor, and a strain sensor that each include such an element array circuit.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. Note that the description is given in the following order.

1. First Example Embodiment: a first example of an element array circuit including power feeding lines, readout lines, and operational amplifiers
2. Second Example Embodiment: a second example of the element array circuit including the power feeding lines, the readout lines, and the operational amplifiers
3. Third Example Embodiment: a third example of the element array circuit including the power feeding lines, the readout lines, and the operational amplifiers
4. Fourth Example Embodiment: a first example of an element array circuit including a readout line selector
5. Fifth Example Embodiment: a first example of an element array circuit unit including a plurality of element array circuits
6. Sixth Example Embodiment: a second example of the element array circuit unit including the element array circuits
7. Seventh Example Embodiment: a third example of the element array circuit unit including the element array circuits
8. Eighth Example Embodiment: a fourth example of the element array circuit unit including the element array circuits
9. Ninth Example Embodiment: an example of a sensor device including the element array circuit
10. Modification Examples

1. First Example Embodiment

Overall Configuration Example of Element Array Circuit 1

FIG. 1 is a circuit diagram schematically illustrating a configuration example of an element array circuit 1 according to a first example embodiment of the disclosure. The element array circuit 1 may be mountable on, for example, an infrared thermography device, and may be configured to output an output voltage corresponding to an intensity of infrared rays applied to the element array circuit 1.

As illustrated in FIG. 1, the element array circuit 1 may include, for example, power feeding lines A denoted as A1 to Am in FIG. 1, readout lines B denoted as B1 to Bn in FIG. 1, resistors Z denoted as Z(1, 1) to Z(m, n) in FIG. 1, operational amplifiers OP denoted as OP1 to OPn in FIG. 1, resistors RE denoted as RE1 to REn in FIG. 1, a power feeding line selector SA, and a processor CTRL. Although "m" power feeding lines A are provided in the example embodiment illustrated in FIG. 1, the number of the power feeding lines A is not limited to "m", and may be freely chosen from among integers of two or more. Similarly, although "n" readout lines B are provided in the example embodiment illustrated in FIG. 1, the number of the readout lines B is not limited to "n", and may be freely chosen from among integers of two or more. In FIG. 1, Z(a, b) denotes the resistor Z coupled to both an "a"-th power feeding line Aa among the "m" power feeding lines A1 to Am and a "b"-th readout line Bb among the "n" readout lines B1 to Bn, where "a" is a natural number less than or equal to "m", and "b" is a natural number less than or equal to "n". The same applies to the drawings subsequent to FIG. 1. The power feeding lines A and the readout lines B may not be in direct contact with each other. Further, in FIG. 1, P(a, b) denotes a node P between the "a"-th power feeding line Aa among the "m" power feeding lines A1 to Am and the resistor Z(a, b). Further, in FIG. 1, K(a, b) denotes a node K between the "b"-th readout line Bb among the "n" readout lines B1 to Bn and the resistor Z(a, b).

Power Feeding Line A

The power feeding lines A may correspond to a specific but non-limiting example of "first wirings" in one embodiment of the disclosure.

The power feeding lines A (A1 to Am in FIG. 1) may each be a conductor extending from a direct-current power supply PS1 described later to a node P(a, n). The power feeding lines A each include a first part PA. In FIG. 1, PA1 to Pam denote the respective first parts PA of the power feeding lines A1 to Am. The first parts PA1 to PAm may each extend in a first direction. The first parts PA1 to PAm may be respective parts of the power feeding lines A1 to Am and have respective lengths LA1 to LAm. For simplifying description, all the first parts PA are assumed to have equal lengths LA in the configuration example of FIG. 1; however, embodiments of the disclosure are not limited thereto. In other words, the respective lengths of the first parts PA may each be set to any value. The first parts PA may be arranged to be adjacent to each other in a second direction different from the first direction. In the example embodiment illustrated in FIG. 1, "m" first parts PA may each extend in an X-axis direction and may be arranged to be adjacent to each other in a Y-axis direction orthogonal to the X-axis direction.

The first part PA1 may be a part from a node P(1, 1) to a node P(1, n) in the power feeding line A1. The first part PA2 may be a part from a node P(2, 1) to a node P(2, n) in the power feeding line A2. The first part PAm may be a part from a node P(m, 1) to a node P(m, n) in the power feeding line Am. Thus, the first part PAa may be a part from a node P(a, 1) to the node P(a, n) in the power feeding line Aa. In other words, each of the first parts PA is a part, of relevant one of the power feeding lines A, to which multiple ones of the resistors Z are coupled.

As illustrated in FIG. 1, the power feeding lines A (A1 to Am) may each have a first end coupled to the direct-current power supply PS1. The power feeding lines A (A1 to Am) may each further include a coupling part WA. In FIG. 1, WA1 to WAm denote the respective coupling parts WA of the power feeding lines A1 to Am. In the power feeding line A1, the coupling part WA1 may be a part from the direct-current power supply PS1 to the node P(1, 1). In the power feeding line A2, the coupling part WA2 may be a part from the direct-current power supply PS1 to the node P(2, 1). In the power feeding line Am, the coupling part WAm may be a part from the direct-current power supply PS1 to the node P(m, 1). Thus, the coupling part WAa may be a part from the direct-current power supply PS1 to the node P(a, 1) in the power feeding line Aa. A coupling wiring WB may be coupled to each of the coupling parts WA. In FIG. 1, WB1 to WBm denote the respective coupling wirings WB coupled to the coupling parts WA1 to WAm. In one example, a second end of the coupling wiring WB1 may be coupled to the coupling part WA1 at a node J1; a second end of the coupling wiring WB2 may be coupled to the coupling part WA2 at a node J2; and a second end of the coupling wiring WBm may be coupled to the coupling part WAm at a node Jm. Thus, the second end of the coupling wiring WBa may be coupled to the coupling part WAa at a node Ja. Note that the second end of the coupling wiring WBa may be coupled to the coupling part WAa at the node P(a, 1). The node Ja and the node P(a, 1) may thus be coincident with each other. Further, a first end of the coupling wiring WBa opposite to the second end may be coupled to a direct-current power supply PS2. As illustrated in FIG. 1, the coupling parts WA (WA1 to WAm) may share their respective portions. Alternatively, the coupling parts WA (WA1 to WAm) may be independent of each other and individually coupled to the direct-current power supply PS1. The direct-current power supply PS1 may be provided inside the element array circuit 1 or outside the element array circuit 1. Similarly, the direct-current power supply PS2 may be provided inside the element array circuit 1 or outside the element array circuit 1. The first end of each of the power feeding lines A (A1 to Am) may be adapted to receive a first voltage V1 from the direct-current power supply PS1. The first end of each of the coupling wirings WB (WB1 to WBm) may be adapted to receive a second voltage V2 from the direct-current power supply PS2.

Corresponding one of switches SWA1 (SWA1-1 to SWA1-*m*) may be provided at a point between the direct-current power supply PS1 and the node P(a, 1) on the power feeding line Aa. For example, the switch SWA1-1 may be provided at a point between the direct-current power supply PS1 and the node P(1, 1) on the power feeding line A1; the switch SWA1-2 may be provided at a point between the direct-current power supply PS1 and the node P(2, 1) on the power feeding line A2; and the switch SWA1-*m* may be provided at a point between the direct-current power supply PS1 and the node P(m, 1) on the power feeding line Am. Further, corresponding one of switches SWAw (SWAw-1 to SWAw-m) may be provided on the coupling wiring WBa. For example, a switch SWA2-1 may be provided on the coupling wiring WB1, a switch SWA2-2 may be provided on the coupling wiring WB2, and a switch SWA2-*m* may be provided on the coupling wiring WBm.

To each of the power feeding lines A, multiple ones of the resistors Z may be coupled at their respective first ends. In the example embodiment illustrated in FIG. 1, "n" resistors Z may be coupled in parallel to each of the "m" power feeding lines A. In one example, the resistors Z(1, 1) to Z(1, n) may be coupled at their respective first ends to the power feeding line A1 extending in the X-axis direction. For example, the power feeding line A1 and the resistor Z(1, 1) may be coupled to each other at the node P(1, 1). The power feeding line A1 and the resistor Z(1, 2) may be coupled to each other at the node P(1, 2). The power feeding line A1 and the resistor Z(1, n) may be coupled to each other at the node P(1, n). Thus, a "b"-th resistor Z(1, b) from the node P(1, 1) may be coupled to the power feeding line A1 at a "b"-th node P(1, b) from the node P(1, 1).

Similarly, the resistors Z(2, 1) to Z(2, n) may be coupled at their respective first ends to the power feeding line A2 extending in the X-axis direction. In one example, the power feeding line A2 and the resistor Z(2, 1) may be coupled to each other at the node P(2, 1). The power feeding line A2 and the resistor Z(2, 2) may be coupled to each other at the node P(2, 2). The power feeding line A2 and the resistor Z(2, n) may be coupled to each other at the node P(2, n). Thus, a "b"-th resistor Z(2, b) from the node P(2, 1) may be coupled to the power feeding line A2 at a "b"-th node P(2, b) from the node P(2, 1).

Further, the resistors Z(m, 1) to Z(m, n) may be coupled at their respective first ends to the power feeding line Am extending in the X-axis direction. In one example, the power feeding line Am and the resistor Z(m, 1) may be coupled to each other at the node P(m, 1). The power feeding line Am and the resistor Z(m, 2) may be coupled to each other at the node P(m, 2). The power feeding line Am and the resistor Z(m, n) may be coupled to each other at the node P(m, n). Thus, a "b"-th resistor Z(m, b) from the node P(m, 1) may be coupled to the power feeding line Am at a "b"-th node P(m, b) from the node P(m, 1).

In this way, the resistors Z(a, 1) to Z(1, n) may be coupled at their respective first ends to the power feeding line Aa extending in the X-axis direction. In the example embodiment illustrated in FIG. 1, the resistors Z(1, n) to Z(m, n) arranged in the Y-axis direction may be coupled at their respective first ends to the nodes P(1, n) to P(m, n) of the "m" power feeding lines A. The nodes P(1, n) to P(m, n) may be respective second ends of the "m" power feeding lines A opposite to the respective first ends of the "m" power feeding lines A.

In the example embodiment illustrated in FIG. 1, if we let R(a, b) denote an electrical resistance value of a portion from the node P(a, b) to the node P(a, b+1) in the first part PAa of the power feeding line Aa, an electrical resistance value of an entire portion from the node P(a, 1) to the node P(a, n), that is, an electrical resistance value of the first part PAa of the power feeding line Aa may be expressed by the following expression:

$$\{R(a,1)+R(a,2)+\ldots+R)a,n-1)\}=\sum\{R(a,i)\}$$

where i is an integer within a range from 1 to n−1 both inclusive.

Further, let LAa denote a length from the node P(a, 1) to the node P(a, n). In this case, an electrical resistance value per unit length of the first part PAa, hereinafter simply referred to as RPAa, of the power feeding line Aa may be expressed by Expression (1) below.

$$RPAa = \{R(a, 1) + R(a, 2) + \ldots + R(a, n-1)\}/LAa = \sum\{R(a, i)\}/LAa \quad (1)$$

where i is an integer within the range from 1 to n−1 both inclusive.

Further, if we let RWA(a) denote an electrical resistance value of the coupling part WAa of the power feeding line Aa and let LWAa denote a length of the coupling part WAa of the power feeding line Aa, an electrical resistance value per unit length of the coupling part WAa, hereinafter simply referred to as RWAa, may be expressed by Expression (2) below:

$$RWAa = RWA(a)/LWAa. \quad (2)$$

Accordingly, an electrical resistance value per unit length of the power feeding line Aa, hereinafter simply referred to as RAa, may be expressed by Expression (3) below:

$$RAa = \left[\sum\{R(a, i)\} + RWA(a)\right]/(LAa + LWAa). \quad (3)$$

In the element array circuit 1, the electrical resistance value per unit length RWAa of the coupling part WAa may be smaller than the electrical resistance value per unit length RPAa of first part PAa:

$$RWAa < RPAa. \quad (4)$$

Power Feeding Line Selector SA

The power feeding line selector SA may correspond to a specific but non-limiting example of a "first wiring selector" in one embodiment of the disclosure.

The power feeding line selector SA may include the switches SWA1 (SWA1-1 to SWA1-*m*) and the switches SWA2 (SWA2-1 to SWA2-*m*). The switches SWA1 (SWA1-1 to SWA1-*m*) and the switches SWA2 (SWA2-1 to SWA2-*m*) may each be switchable between a conducting state and a nonconducting state. The switches SWA1 (SWA1-1 to SWA1-*m*) may each be provided at a point between the direct-current power supply PS1 and the node P(a, 1) on corresponding one of the power feeding lines Aa. The switches SWA2 (SWA2-1 to SWA2-*m*) may each be provided on corresponding one of the coupling wirings WB (WB1 to WBm).

The power feeding line selector SA may select one power feeding line A from among the power feeding lines A. For convenience, the one power feeding line A selected from among the power feeding lines A will be referred to as a selected power feeding line AS. The power feeding line selector SA may couple the first part PA of the selected power feeding line AS to the direct-current power supply PS1 and couple the first parts PA of all the other power feeding lines A to the direct-current power supply PS2. For convenience, the power feeding lines A other than the selected power feeding line AS will each be referred to as an unselected power feeding line AU. The first voltage V1 may be applied to the first end of the selected power feeding line AS by the direct-current power supply PS1. Note that in the selected power feeding line AS, a voltage drop may occur due to a wiring resistance of the selected power feeding line AS and a current flowing through the selected power feeding line AS. The second voltage V2 may be applied to the first parts PA of the unselected power feeding lines AU by the direct-current power supply PS2. The second voltage V2 may be different from the first voltage V1. A voltage applied to the first part PA of the selected power feeding line AS is different from the voltage (i.e., the second voltage V2) applied to the first parts PA of the unselected power feeding lines AU. Operation of the power feeding line selector SA may be controlled by the processor CTRL. For example, a switching operation of the power feeding line selector SA on each of the switches SWA1 (SWA1-1 to SWA1-*m*) and each of the switches SWA2 (SWA2-1 to SWA2-*m*) may be executed based on a command from the processor CTRL.

Processor CTRL

The processor CTRL may be a microcomputer, for example. The processor CTRL may execute predetermined control processing by causing a central processing unit (CPU) to execute a control program. The processor CTRL may control, for example, the switching operation on each of the switches SW.

In one example, the processor CTRL may control the switching operation of the power feeding line selector SA. For example, the processor CTRL may cause one switch SWA1 corresponding to the selected power feeding line AS to be in the conducting state and cause the other switches SWA1 corresponding to the unselected power feeding lines AU to be in the nonconducting state. In addition, the processor CTRL may cause one switch SWA2 corresponding to the selected power feeding line AS to be in the nonconducting state and cause the other switches SWA2 corresponding to the unselected power feeding lines AU to be in the conducting state. Here, the selected power feeding line AS may be one power feeding line A corresponding to a selected resistor ZS, which is resistor selected from among the resistors Z. The unselected power feeding lines AU may be all the power feeding lines A excluding the selected power feeding line AS.

The processor CTRL may measure an output voltage that results from the selected resistor ZS coupled to both the selected power feeding line AS and one of the readout lines B and that is outputted from an output terminal T3 of one operational amplifier OP corresponding to the one of the readout lines B. In the element array circuit 1, the second voltage V2 having a value different from the value of the first voltage V1 applied to the first end of the one selected power feeding line AS selected from among the power feeding lines A may be applied to both the first parts PA of the unselected power feeding lines AU and a positive input terminal T1 of the operational amplifier OP. In other words, the first parts PA of the unselected power feeding lines AU and the positive input terminal T1 of the operational amplifier OP may receive the same voltage, i.e., the second voltage V2.

Readout Line B

The readout lines B may correspond to a specific but non-limiting example of "second wirings" in one embodiment of the disclosure.

The readout lines B (B1 to Bn in FIG. 1) may each be a conductor extending from a node K(1, b) to an operational amplifier OPb. The readout lines B each include a second part PB. In FIG. 1, PB1 to PBn denote the respective second parts PB of the readout lines B1 to Bn. The second parts PB1 to PBn may each extend in a second direction different from the first direction. The second parts PB1 to PBn may be respective parts of the readout lines B1 to Bn and have respective lengths LB1 to LBn. For simplifying description, all the second parts PB are assumed to have equal lengths LB in the present example embodiment; however, embodiments of the disclosure are not limited thereto. In other words, the respective lengths of the second parts PB may each be set to any value. The second parts PB may be arranged to be adjacent to each other in the first direction different from the second direction. In the example embodiment illustrated in FIG. 1, "n" second parts PB may each extend in the Y-axis direction and may be arranged to be adjacent to each other in the X-axis direction. The second part PB1 may be a part from a node K(1, 1) to a node K(m, 1) in the readout line B1. The second part PB2 may be a part from a node K(1, 2) to a node K(m, 2) in the readout line B2. The second part PBn may be a part from a node K(1, n) to a node K(m, n) in the readout line Bn. Thus, the second part PBb may be a part from the node K(1, b) to a node K(m, b) in the readout line Bb. In other words, each of the second parts PB is a part, of relevant one of the readout lines B, to which multiple ones of the resistors Z are coupled.

The readout line Bb may have a first end coupled to a second end of the resistor Z(1, b). The second end of the resistor Z(1, b) may be opposite to the first end, of the resistor Z(1, b), coupled to the power feeding line A1. In the example embodiment illustrated in FIG. 1, "m" resistors Z may be coupled to the readout line Bb. In one example, the second end of the resistor Z(1, 1) may be coupled to the first end of the readout line B1 extending in the Y-axis direction. The readout line B1 and the resistor Z(1, 1) may be coupled to each other at the node K(1, 1). To the readout line B1, further, the resistor Z(2, 1) may be coupled at the node K(2, 1) and the resistor Z(m, 1) may be coupled at the node K(m, 1). Further, the second end of the resistor Z(1, 2) may be coupled to the first end of the readout line B2 extending in the Y-axis direction. The readout line B2 and the resistor Z(1, 2) may be coupled to each other at the node K(1, 2). To the readout line B2, further, the resistor Z(2, 2) may be coupled at the node K(2, 2) and the resistor Z(m, 2) may be coupled at the node K(m, 2). Further, the second end of the resistor Z(1, n) may be coupled to the first end of the readout line Bn extending in the Y-axis direction. The readout line Bn and the resistor Z(1, n) may be coupled to each other at the node K(1, n). To the readout line Bn, further, the resistor Z(2, n) may be coupled at the node K(2, n) and the resistor Z(m, n) may be coupled at the node K(m, n).

The readout lines B may each have a second end coupled to corresponding one of the operational amplifiers OP. The second end of each of the readout lines B may be opposite to the first end, of relevant one of the readout lines B, to be coupled to corresponding one of the resistors Z(1, b). In one example, the second end of the readout line B1 may be coupled to a negative input terminal T2 of the operational amplifier OP1, the second end of the readout line B2 may be coupled to the negative input terminal T2 of the operational amplifier OP2, and the second end of the readout line Bn may be coupled to the negative input terminal T2 of the operational amplifier OPn. Through each of the readout lines B, signals flow that indicate respective states of the resistors Z coupled to relevant one of the readout lines B.

In the example embodiment illustrated in FIG. 1, in the readout line B1, the second part PB1 extending from the node K(1, 1) to the node K(m, 1) may have an electrical resistance value of r(1). In the readout line B2, the second part PB2 extending from the node K(1, 2) to the node K(m, 2) may have an electrical resistance value of r(2). In the readout line Bn, the second part PBn extending from the node K(1, n) to the node K(m, n) may have an electrical resistance value of r(n). The second parts PB1 to PBn of the readout lines B1 to Bn may have respective lengths LB1 to LBn. Accordingly, an electrical resistance value per unit length of the second part PB1, hereinafter simply referred to as RPB1, may be expressed by Expression (5.1) below. Similarly, an electrical resistance value per unit length of the second part PB2, hereinafter simply referred to as RPB2, may be expressed by Expression (5.2) below, and an electrical resistance value per unit length of the second part PBn, hereinafter simply referred to as RPBn, may be expressed by Expression (5.3) below.

$$RPB1 = r(1)/LB1; \tag{5.1}$$

$$RPB2 = r(2)/LB2; \text{ and} \tag{5.2}$$

$$RPBn = r(n)/LBn. \tag{5.3}$$

Thus, an electrical resistance value per unit length of the second part PBb, hereinafter simply referred to as RPBb, of the "b"-th readout line Bb may be expressed by Expression (5.4) below:

$$RPBb = r(b)/LBb. \tag{5.4}$$

In the element array circuit 1 according to the present example embodiment, RPAa may be smaller than RPBb. The element array circuit 1 may thus have the following relationship:

$$RPAa < RPBb. \tag{6}$$

In addition, in the element array circuit 1, the electrical resistance value per unit length RWAa of the coupling part WAa may be smaller than the electrical resistance value per unit length RPBb of the second part PBb of the readout line Bb:

$$RWAa < RPBb. \tag{7}$$

Further, in the element array circuit 1, the electrical resistance value per unit length (RAa) of the power feeding line Aa extending from the direct-current power supply PS1 to the node P(a, n) may be smaller than the electrical resistance value per unit length (RBb) of the readout line Bb extending from the node K(1, b) to the operational amplifier OPb:

$$RAa < RBb. \quad (8)$$

Resistor Z

The resistors Z may correspond to a specific but non-limiting example of "impedance elements" in one embodiment of the disclosure.

The resistors Z may each be coupled to both one of the power feeding lines A and one of the readout lines B. The resistors Z may each have the first end coupled to the one of the power feeding lines A and the second end coupled to the one of the readout lines B. As described above, in the example embodiment illustrated in FIG. 1, "n" resistors Z may be coupled to each of the power feeding lines A1 to Am, and "m" resistors Z may be coupled to each of the readout lines B1 to Bn. The number of the resistors Z coupled to both one of the power feeding lines A and one of the readout lines B may be one. Accordingly, it is possible to specify a single resistor Z by selecting a single power feeding line A from among the power feeding lines A and selecting a single readout line B from among the readout lines B.

Regarding the "n" resistors Z to be coupled to the power feeding line A1, in one example, the first end of the resistor Z(1, 1) may be coupled to the power feeding line A1 at the node P(1, 1), and the second end of the resistor Z(1, 1) may be coupled to the first end of the readout line B1 at the node K(1, 1). Further, the first end of the resistor Z(1, 2) may be coupled to the power feeding line A1 at the node P(1, 2), and the second end of the resistor Z(1, 2) may be coupled to the first end of the readout line B2 at the node K(1, 2). Further, the first end of the resistor Z(1, n) may be coupled to the power feeding line A1 at the node P(1, n), and the second end of the resistor Z(1, n) may be coupled to the first end of the readout line Bn at the node K(1, n). The same may apply to the "n" resistors Z to be coupled to each of the power feeding lines A other than the power feeding line A1.

The resistors Z may each be a component of an infrared light receiving device that converts infrared rays condensed by, for example, a lens into an electric signal. In one example, the resistors Z may each include a resistance change layer whose resistance changes with changing temperature, for example. Non-limiting examples of the resistance change layer may include a thermistor film. The thermistor film may include, for example, vanadium oxide, amorphous silicon, polycrystalline silicon, a manganese-containing oxide having a spinel crystal structure, titanium oxide, or yttrium-barium-copper oxide. The resistors Z may each further include an infrared absorption layer adjacent to the thermistor film. The infrared absorption layer may absorb infrared rays and generate heat. The infrared absorption layer may include, for example, silicon oxide ($SiO_2$), aluminum oxide ($AlO_3$), silicon nitride ($Si_3N_4$), or aluminum nitride (AlN). Temperatures of the infrared absorption layer and the resistance change layer may change with intensity of received infrared rays, and as a result, the resistance change layer of each of the resistors Z may change in electrical resistance value.

In performing measurement on the selected resistor ZS, one of the switches SWA1 that corresponds to the selected power feeding line AS, that is, the single power feeding line AS to which the selected resistor ZS is coupled, may be caused to be in the conducting state to thereby cause the first voltage V1 to be applied to the first end of the selected power feeding line AS from the direct-current power supply PS1. Further, in performing the measurement on the selected resistor ZS, the second voltage V2 not equal to the first voltage V1 may be applied to the first parts PA of the unselected power feeding lines AU, that is, all the power feeding lines A other than the selected power feeding line AS, through the switches SWA2 that correspond to the respective unselected power feeding lines AU and that are in the conducting state.

By way of example, FIG. 1 illustrates a state where the resistors Z(1, 1) to Z(1, n) are selected. For example, FIG. 1 illustrates a state where the switch SWA1-1 is in the conducting state to cause the first voltage V1 to be applied from the direct-current power supply PS1 to the first end of the power feeding line A1 as the selected power feeding line AS corresponding to the selected resistors Z(1, 1) to Z(1, n). FIG. 1 further illustrates a state where the switches SWA2-2 to SWA2-*m* are in the conducting state to cause the second voltage V2, which is not equal to the first voltage V1, to be applied to the first parts PA of the power feeding lines A2 to Am as all the unselected power feeding lines AU other than the selected power feeding line A1. In this situation, the switches SWA1-2 to SWA1-*m* provided on the power feeding lines A2 to Am as the unselected power feeding lines AU may all be in the nonconducting state, and the switch SWA2-1 corresponding to the power feeding line A1 as the selected power feeding line AS may also be in the nonconducting state. Note that the first voltage V1 and the second voltage V2 may be simply different from each other. Either the first voltage V1 or the second voltage V2 may be 0 V.

Operational Amplifier OP

The operational amplifiers OP may each be coupled to corresponding one of the readout lines B. The operational amplifiers OP, which are denoted as OP1 to OPn in FIG. 1, may each include the positive input terminal T1, the negative input terminal T2, and the output terminal T3. The positive input terminal T1 of each of the operational amplifiers OP may be coupled to, for example, the direct-current power supply PS2, and may thus receive the second voltage V2 different from the first voltage V1. The second voltage V2 may be 0 V, for example. The negative input terminal T2 of each of the operational amplifiers OP may be coupled to the corresponding one of the readout lines B. Each of the operational amplifiers OP may operate to cause the positive input terminal T1 and the negative input terminal T2 to be at the same potential, and accordingly, the potential at the negative input terminal T2 may be substantially equal to the second voltage V2. In each of the operational amplifiers OP, the output terminal T3 may be coupled to the negative input terminal T2 through corresponding one of the resistors RE.

Resistor RE

The resistors RE may correspond to a specific but non-limiting example of "one or more conversion elements" in one embodiment of the disclosure. The resistors RE may each include a resistor element including, for example, a metal material having a predetermined specific resistance. The resistors RE may each be coupled to both the negative input terminal T2 and the output terminal T3 of corresponding one of the operational amplifiers OP, and may each convert a current flowing through the readout line B coupled to the negative input terminal T2 into a voltage. In one example, in the example embodiment illustrated in FIG. 1, the resistor RE1 may be coupled to both the negative input terminal T2 and the output terminal T3 of the operational amplifier OP1, and may convert a current flowing through the readout line B1 into a voltage. Similarly, the resistor RE2 may be coupled to both the negative input terminal T2 and the output terminal T3 of the operational amplifier OP2, and may convert a current flowing through the readout line B2 into a voltage; and the resistor REn may be coupled to both the negative input terminal T2 and the output terminal T3 of the operational amplifier OPn, and may convert a current flowing through the readout line Bn into a voltage.

Measurement Operation in Element Array Circuit 1

In the element array circuit 1, it is possible to measure an output voltage corresponding to each of the resistors Z in the following manner, for example, in a measurement environment in which infrared-ray irradiation is performed. The following measurement operation may be performed in accordance with a command from the processor CTRL.

First, the power feeding line A corresponding to the selected resistor ZS targeted for measurement may be selected to be the selected power feeding line AS. In one example, the switch SWA1 of the selected power feeding line AS to which the selected resistor ZS is coupled may be caused to be in the conducting state and the first voltage V1 may be applied to the first end of the selected power feeding line AS. The other switches SWA1 corresponding to the unselected power feeding lines AU may be caused to be in the nonconducting state. Further, the switches SWA2 corresponding to the unselected power feeding lines AU may be caused to be in the conducting state and the second voltage V2 may be applied to the first parts PA of the unselected power feeding lines AU. The switch SWA2 corresponding to the selected power feeding line AS may be caused to be in the nonconducting state. FIG. 1 illustrates an example state where the resistors Z(1, 1) to Z(1, n) are selected to be the selected resistors ZS. In this case, the switch SWA1-1 corresponding to the power feeding line A1 as the selected power feeding line AS may be caused to be in the conducting state, and the first voltage V1 may be applied to the first end of the power feeding line A1. The switches SWA1-2 to SWA1-*m* corresponding to the power feeding lines A2 to Am as the unselected power feeding lines AU may be caused to be in the nonconducting state. Further, the switches SWA2-2 to SWA2-*m* corresponding to the power feeding lines A2 to Am as the unselected power feeding lines AU may be caused to be in the conducting state, and the second voltage V2 may be applied to the first parts PA2 to PAm of the power feeding lines A2 to Am. The switch SWA2-1 corresponding to the power feeding line A1 as the selected power feeding line AS may be caused to be in the nonconducting state. The second voltage V2 may also be applied to the positive input terminal T1 of each of the operational amplifiers OP1 to OPn. This causes the voltage applied to the resistors Z other than the resistors Z(1, 1) to Z(1, n) as the selected resistors ZS to be zero, thus causing no current to flow through the resistors Z other than the resistors Z(1, 1) to Z(1, n).

Thereafter, an output voltage corresponding to each selected resistor ZS may be measured. In one example, the output voltage may be measured that results from the selected resistor ZS coupled to both the selected power feeding line AS and one of the readout lines B and that is outputted from the output terminal T3 of one of the operational amplifiers OP corresponding to the one of the readout lines B. In the example embodiment of FIG. 1, when the resistor Z(1, 1) coupled to both the power feeding line A1 and the readout line B1 is the selected resistor ZS, an output voltage Vout outputted from the output terminal T3 of the operational amplifier OP1 corresponding to the resistor Z(1, 1) may be measured. When the resistor Z(1, 2) coupled to both the power feeding line A1 and the readout line B2 is the selected resistor ZS, an output voltage Vout outputted from the output terminal T3 of the operational amplifier OP2 corresponding to the resistor Z(1, 2) may be measured. When the resistor Z(1, n) coupled to both the power feeding line A1 and the readout line Bn is the selected resistor ZS, an output voltage Vout outputted from the output terminal T3 of the operational amplifier OPn corresponding to the resistor Z(1, n) may be measured. Respective potentials at the nodes P on the power feeding line A1 (i.e., respective potentials Vf (Vf1 to Vfn) at the nodes P(1, 1) to P(1, n)) may each be different from a potential at the node K (one of the nodes K(1, 1) to K(1, n)) corresponding to relevant one of the nodes P, that is, a potential at the readout line B (one of the readout lines B1 to Bn) corresponding to the relevant one of the nodes P. In other words, the potential at each of the nodes P on the selected power feeding line AS, that is, the potential at each of the nodes P to which corresponding one of the selected resistors ZS is coupled, may be different from the potential at the node K corresponding to relevant one of the nodes P, that is, the potential at the readout line B corresponding to the relevant one of the nodes P. The potential at the node K, i.e., the potential at the readout line B, may be substantially equal to the second voltage V2 that is the potential at the negative input terminal T2. To each of the resistors Z(1, 1) to Z(1, n), a voltage corresponding to a difference between one of the potentials Vf1 to Vfn at corresponding one of the nodes P(1, 1) to P(1, n) and the potential at corresponding one of the readout lines B1 to Bn may be applied. As a result, currents corresponding to respective electrical resistance values of the resistors Z(1, 1) to Z(1, n) may flow through the respective resistors Z(1, 1) to Z(1, n). The currents flowing through the respective resistors Z(1, 1) to Z(1, n) may flow through the respective readout lines B1 to Bn. The currents flowing through the respective readout lines B1 to Bn may be converted into voltages by the respective resistors RE1 to REn, and outputted as the output voltages Vout from the respective output terminals T3 of the operational amplifiers OP1 to OPn corresponding to the respective resistors Z(1, 1) to Z(1, n). The output voltages Vout may each be expressed by Expression (9) below.

$$Vout = -(re/z) \times (Vf - V2) \tag{9}$$

where:

- re is an electrical resistance value of one resistor RE coupled to the operational amplifier OP corresponding to relevant one of the selected resistors ZS;
- z is an electrical resistance value of the relevant one of the selected resistors ZS;
- Vf is the potential at the node P corresponding to the relevant one of the selected resistors ZS; and
- V2 is the second voltage of the direct-current power supply PS2.

Figure 2:
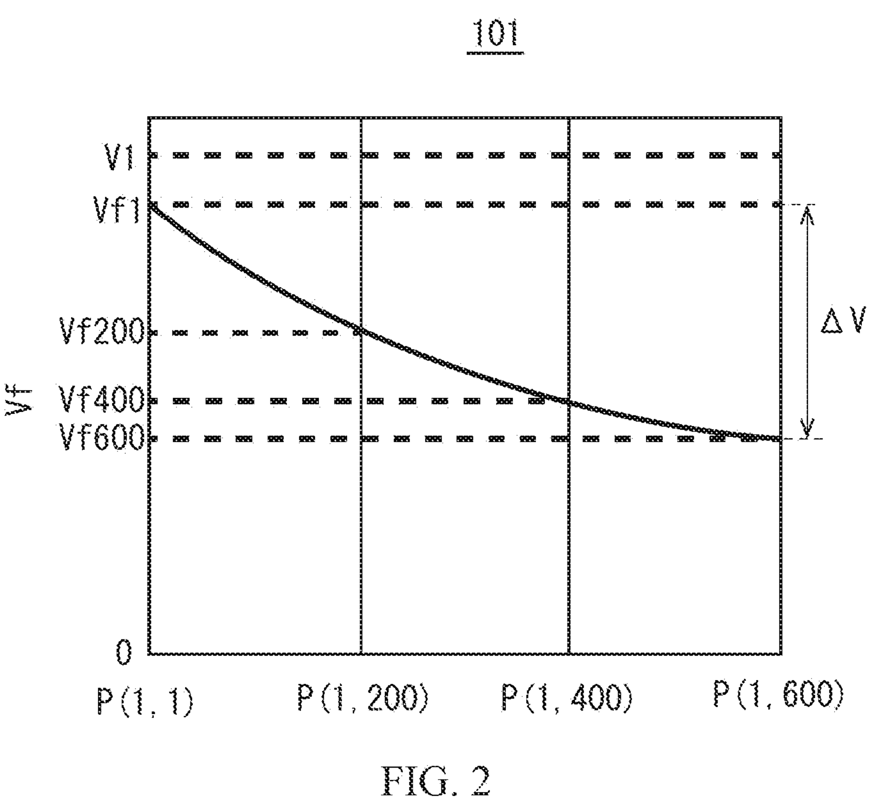
FIG. 2 is a characteristic diagram schematically illustrating a relationship between a position of a node and a voltage applied to each of resistors in an element array circuit according to a referenced example.

Here, the potential Vf should ideally be equal to the first voltage V1 that is a power supply voltage of the direct-current power supply PS1. In actuality, however, due to a voltage drop resulting from a wiring resistance of the power feeding line A itself, the potential Vf can become smaller than the first voltage V1 (Vf<V1). FIG. 2 is a characteristic diagram schematically illustrating a relationship between a position of each of the nodes P(1, 1) to P(1, n) on the power feeding line A and the potential Vf at corresponding one of the nodes P(1, 1) to P(1, n) in an element array circuit 101 according to a reference example, where n=600. The element array circuit 101 according to the reference example has a configuration similar to the configuration of the element array circuit 1 according to the present example embodiment, except that RPAa≥RPBb, that is, the electrical resistance value per unit length (RPAa) of the first part PAa is greater than or equal to the electrical resistance value per unit length (RPBb) of the second part PBb. In FIG. 2, the horizontal axis represents the respective positions of the nodes P(1, 1) to P(1, n) on the power feeding line A, and the vertical axis represents the potential Vf. As indicated in FIG. 2, the potential Vf decreases to differ more greatly from the first voltage V1 with increasing distance from the node P(1, 1), i.e., a first end of the first part PA. For example, a potential Vf200 at a node P(1, 200) to which a 200th resistor Z(1, 200) from the first end of the first part 200PA is coupled is lower than the potential Vf1 at the node P(1, 1). Furthermore, a potential Vf400 at a node P(1, 400) to which a 400th resistor Z(1, 400) from the first end of the first part PA is coupled is lower than the potential Vf200. Furthermore, a potential Vf600 at a node P(1, 600) to which a 600th resistor Z(1, 600) from the first end of the first part PA is coupled is lower than the potential Vf400. The potential Vf600 exhibits a drop with respect to the potential Vf1 by ΔV. Here, the drop ΔV (i.e., a voltage drop ΔV) is given by: ΔV=Σ{I(1, b)×R(1, b)}, where I(1, b) is a current flowing through a "b"-th section among multiple sections of a path from the node P(1, 1) to the node P(1, 600), R(I, b) is an electrical resistance value of the "b"-th section, and b is an integer within the range from 1 to n−1 both inclusive.

Figure 3:
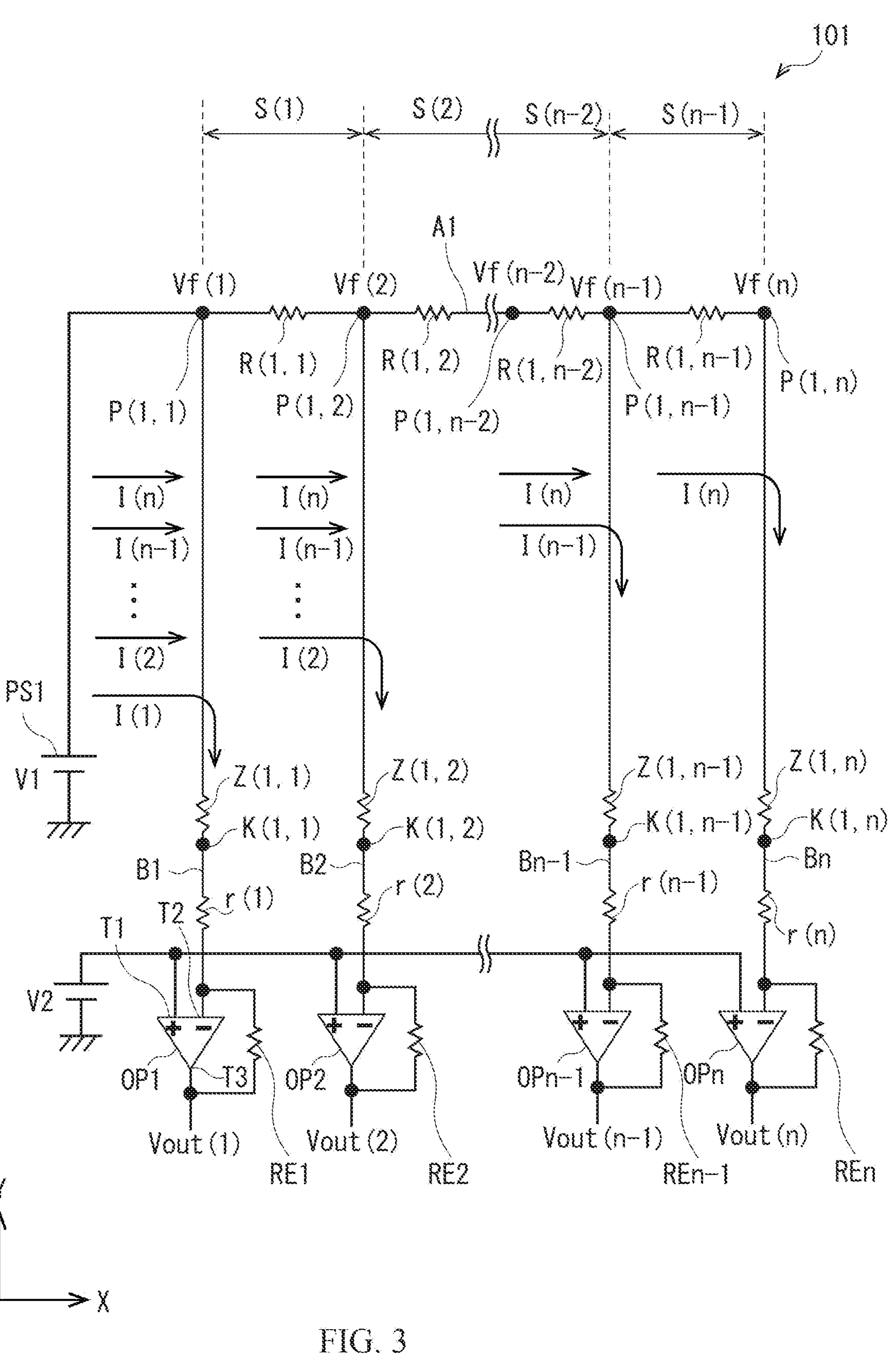
FIG. 3 is an explanatory diagram illustrating a relationship between an increase in the number of resistors coupled in parallel and an increase in voltage drop in the element array circuit according to the referenced example.

Such a voltage drop ΔV increases with increasing number of the resistors Z coupled in parallel. FIG. 3 is an explanatory diagram illustrating a relationship between an increase in the number of the resistors Z coupled in parallel and an increase in the voltage drop ΔV in the element array circuit 101 according to the referenced example. Here, if we let Vf(n) denote a potential at the node P(1, n), a voltage drop ΔV(n−1) occurring at a section S(n−1) is given by Vf(n−1)-Vf(n), a voltage drop ΔV(n−2) occurring at a section S(n−2) is given by Vf(n−2)−Vf(n−1), and a voltage drop ΔV(1) occurring at a section S(1) is given by Vf(1)-Vf(2). Note that the section S(n−1) is a part between the node P(1, n) and a node P(1, n−1) before the node P(1, n) in the power feeding line A1. The node P(1, n−1) is a node between the power feeding line A1 and the resistor Z(1, n−1). Similarly, the section S(n−2) is a part between the node P(1, n−1) and a node P(1, n−2) before the node P(1, n−1) in the power feeding line A1. The section S(1) is a part between the node P(1, 2) and the node P(1, 1) before the node P(1, 2) in the power feeding line A1.

Accordingly, if we let ΔV(0) denote a voltage drop occurring at a part between the direct-current power supply PS1 and the node P(1, 1), the potential Vf(1) at the node P(1, 1) is lower in value than V1 by ΔV(0). That is, the following expression holds:

$$Vf(1) = V1 - \Delta V(0).$$

Similarly, the potential Vf(2) at the node P(1, 2) is given by:

$$Vf(2) = V1 - \{\Delta V(0) + \Delta V(1)\},$$

the potential Vf(n−1) at the node P(1, n−1) is given by:

$$Vf(n-1) = V1 - \{\Delta V(0) + \Delta V(1) + \ldots + \Delta V(n-2)\},$$

the potential Vf(n) at the node P(1, n) is given by:

$$Vf(n) = V1 - \{\Delta V(0) + \Delta V(1) + \ldots + \Delta V(n-2) + \Delta V(n-1)\}.$$

Accordingly, the drop ΔV, with respect to V1, of the potential Vf(n) at the node P(1, n) located farthest from the first end of the first part PA among the nodes P(1, 1) to P(1, n) increases with increasing number n of the resistors Z coupled in parallel.

Further, as illustrated in FIG. 3, only a current I(n) passing through the node P(1, n) flows through the resistor Z(1, n) farthest from the node P(1, 1), i.e., the first end of the first part PA. Thus, only the current I(n) flows through the section S(n−1) of the first part PA. The current I(n) is a current flowing through the resistor Z(1, n). Further, a current I(n−1) in addition to the current I(n) flows through the section S(n−2) of the first part PA. The current I(n−1) is a current flowing through the resistor Z(1, n−1). Further, a current I(2) to the current I(n) that respectively flow through the resistor Z(1, 2) to the resistor Z(1, n) all flow through the section S(1). Furthermore, a current I(1) to the current I(n) that respectively flow through the resistor Z(1, 1) to the resistor Z(1, n) all flow through the part between the direct-current power supply PS1 and the node P(1, 1). The voltage drop at a section S sandwiched by two adjacent nodes P increases proportionately with a product of the electrical resistance value of the section S and the current flowing through the section S. A total amount of the current I flowing is larger in a section closer to the node P(1, 1) that is the first end of the first part PA. Accordingly, the section closer to the node P(1, 1) is more likely to exhibit a large voltage drop.

Due to the occurrence of such a voltage drop, the potential Vf has different values depending on respective coupling positions of the resistors Z to the power feeding line A. This degrades accuracy of measured values of the output voltages Vout, as a natural result. For example, even when infrared rays of the same intensity are applied to the resistors Z, values of the output voltages Vout are different depending on the respective coupling positions of the resistors Z to the power feeding line A, resulting in a difference between detected intensities of the infrared rays. In other words, a measurement error occurs. This makes it necessary to take some countermeasures, such as correction of the detected value in consideration of the voltage drop. However, the voltage drop varies under the influence of the currents I flowing through the respective resistors Z. In other words, the voltage drop varies with changes in the respective electrical resistance values of the resistors Z. It is thus not easy to correct the above-described measurement error.

Example Workings and Example Effects of Element Array Circuit 1

To address this, the element array circuit 1 according to the present example embodiment reduces a drop of the potential Vf itself by causing the electrical resistance value per unit length of the first part PA of each of the power feeding lines A to be smaller than the electrical resistance value per unit length of the second part PB of each of the readout lines B and thereby reducing a wiring resistance value of the first part PA of each of the power feeding lines A. This helps to reduce an error of the output voltage Vout calculated by Expression (9) above. The element array circuit 1 thus helps to accurately measure the output voltage Vout related to the electrical resistance value of each of the resistors Z.

Through the second part PB of each of the readout lines B, only the current I flowing through one selected resistor ZS corresponding to relevant one of the readout lines B flows. In contrast, through the first part PA of each of the power feeding lines A, as described above, currents flowing through multiple ones of the resistors Z flow. This allows a voltage drop caused by the wiring resistance of the second part PB itself to be sufficiently smaller than a voltage drop caused by the wiring resistance of the first part PA itself. Accordingly, making the electrical resistance value per unit length of the first part PA smaller than the electrical resistance value per unit length of the second part PB and thereby reducing the wiring resistance value of the first part PA produces a greater effect of improving the measurement accuracy of the output voltage Vout. Further, the output voltage Vout is observed as a value reflecting an electrical resistance value resulting from adding the electrical resistance value of relevant one of the readout lines B to the electrical resistance value of one selected resistor ZS corresponding to the relevant one of the readout lines B. For example, if we let rB denote the electrical resistance value of a part of the readout line B from the node K at which the selected resistor ZS is coupled to the readout line B to the second end of the readout line B, the output voltage Vout is calculable by Expression (10) below:

$$Vout = -\left(re/(z + rB)\right) \times (Vf - V2) \tag{10}$$

where:

- re is the electrical resistance value of one resistor RE coupled to the operational amplifier OP corresponding to relevant one of the selected resistors ZS;
- z is the electrical resistance value of the relevant one of the selected resistors ZS;
- Vf is the potential at the node P corresponding to the relevant one of the selected resistors ZS;
- V2 is the second voltage of the direct-current power supply PS2; and
- rB is the electrical resistance value of the part of relevant one of the readout lines B from the node K at which the selected resistor ZS is coupled to the relevant one of the readout lines B to the second end of the relevant one of the readout lines B.

For example, a range of variation of the electrical resistance value rB versus a temperature variation caused by infrared-ray irradiation is assumable to be substantially constant and sufficiently smaller than a range of variation of the electrical resistance value of each of the resistors Z. It is therefore easy to correct a measurement error of the output voltage Vout related to the electrical resistance value rB.

Moreover, the element array circuit 1 according to the present example embodiment may include the multiple operational amplifiers OP, and each of the operational amplifiers OP may correspond to one of the readout lines B. This helps to quickly measure the output voltage Vout as compared with when multiple redout lines B are each selectively coupled to a single operational amplifier OP to measure the output voltage Vout.

2. Second Example Embodiment

Overall Configuration Example of Element Array Circuit 2

Figure 4:
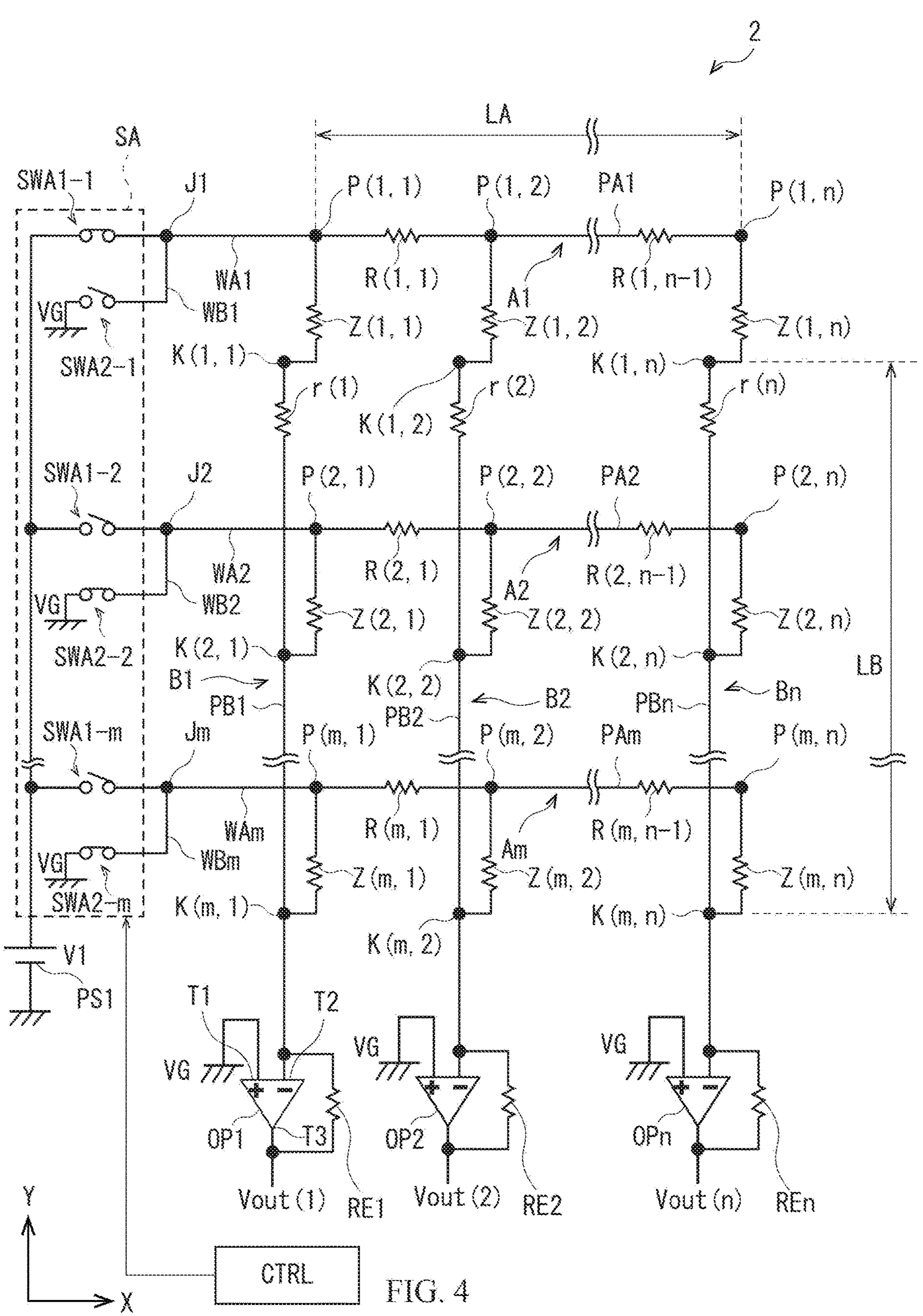
FIG. 4 is a circuit diagram illustrating a configuration example of an element array circuit according to one example embodiment of the disclosure.

FIG. 4 is a circuit diagram schematically illustrating an overall configuration example of an element array circuit 2 according to a second example embodiment of the disclosure. In the element array circuit 1 illustrated in FIG. 1, the direct-current power supply PS2 may be provided to apply the second voltage V2 different from the first voltage V1 to the positive input terminal T1 of each of the operational amplifiers OP and to the first part PA of each of the unselected power feeling lines AU. In contrast, the element array circuit 2 according to the present example embodiment may be without the direct-current power supply PS2. In the element array circuit 2, the positive electrode terminal T1 of each of the operational amplifiers OP and the first part PA of each of the unselected power feeding lines AU may be coupled to a ground terminal, and a ground voltage VG may be applied to the positive electrode terminal T1 of each of the operational amplifiers OP and to the first part PA of each of the unselected power feeding lines AU. The configuration of the element array circuit 2 may be otherwise substantially the same as the configuration of the element array circuit 1 according to the first example embodiment illustrated in FIG. 1.

Example Workings and Example Effects of Element Array Circuit

The element array circuit 2 according to the present example embodiment helps to achieve effects similar to the effects achievable with the element array circuit 1 according to the foregoing first example embodiment. For example, the element array circuit 2 according to the present example embodiment reduces the drop of the potential Vf itself by causing the electrical resistance values per unit length of the respective first parts PA1 to PAm of the power feeding lines A1 to Am to be smaller than the electrical resistance values per unit length of the respective second parts PB1 to PBn of the readout lines B1 to Bn and thereby reducing the wiring resistance values of the first parts PA of the power feeding lines A. This helps to reduce an error of the output voltage Vout calculated by Expression (9) or Expression (10) above. Note that in the present example embodiment, the second voltage V2 of the direct-current power supply PS2 shall be read as the ground voltage VG. The element array circuit 2 thus helps to accurately measure the output voltage Vout related to the electrical resistance value of each of the selected resistors ZS.

3. Third Example Embodiment

Figure 5:
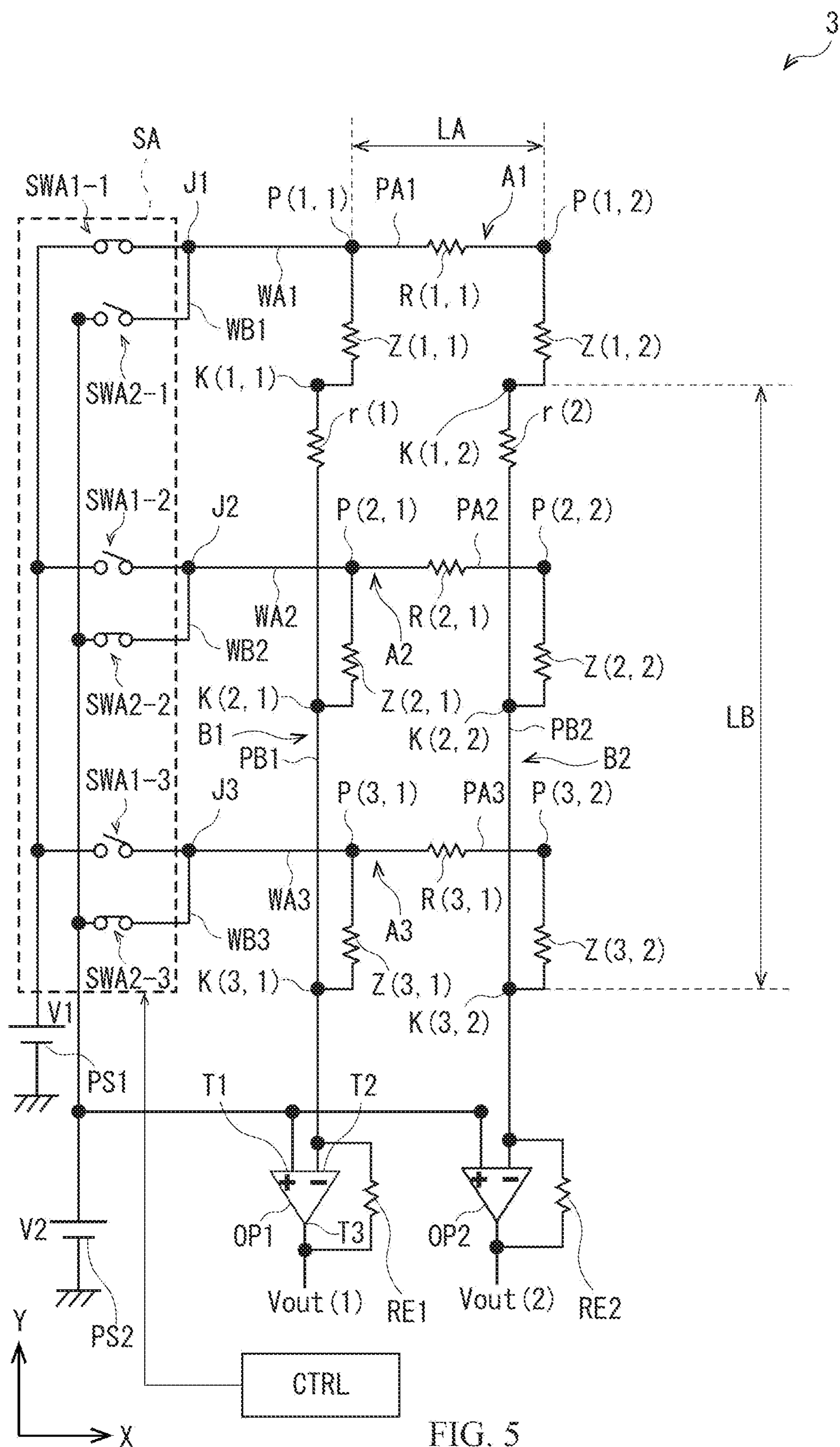
FIG. 5 is a circuit diagram illustrating a configuration example of an element array circuit according to one example embodiment of the disclosure.

FIG. 5 is a circuit diagram schematically illustrating an overall configuration example of an element array circuit 3 according to a third example embodiment of the disclosure. In the element array circuit 3 illustrated in FIG. 5, the number of the readout lines B may be smaller than the number of the power feeding lines A. For example, in the configuration example of the element array circuit 3 illustrated in FIG. 5, the number of the power feeding lines A may be three and the number of the readout lines B may be two. The configuration of the element array circuit 3 may be otherwise substantially the same as the configuration of the element array circuit 1 according to the first example embodiment illustrated in FIG. 1.

In the element array circuit 3, the number of the readout lines B may be smaller than the number of the power feeding lines A. Employing such a configuration helps to reduce the voltage drop at each of the first parts PA to a small value, and to reduce the voltage drop ΔV at each of the power feeding lines A to a small value. For example, in the configuration example of the element array circuit 3 of FIG. 5, two resistors Z may be provided for each of the three power feeding lines A1 to A3, and the number of the readout lines B may be set to two to allow the element array circuit 3 to include a total of six resistors Z. In contrast, it may also be possible to configure an element array circuit including a total of six resistors Z by, for example, providing three resistors Z for each of two power feeding lines A1 and A2 and setting the number of the readout lines B to three. In such a case, however, the voltage drop ΔV occurring at each of the two power feeding lines A1 and A2 increases as compared with that in the element array circuit 3 according to the present example embodiment. The element array circuit 3 according to the present example embodiment has a configuration in which the length of each of the first parts PA is reduced by reducing the number of the resistors Z coupled in parallel to each of the power feeding lines A. Such a configuration is suitable for reducing the voltage drop at each of the first parts PA.

4. Fourth Example Embodiment

Overall Configuration Example of Element Array Circuit 4

Figure 6:
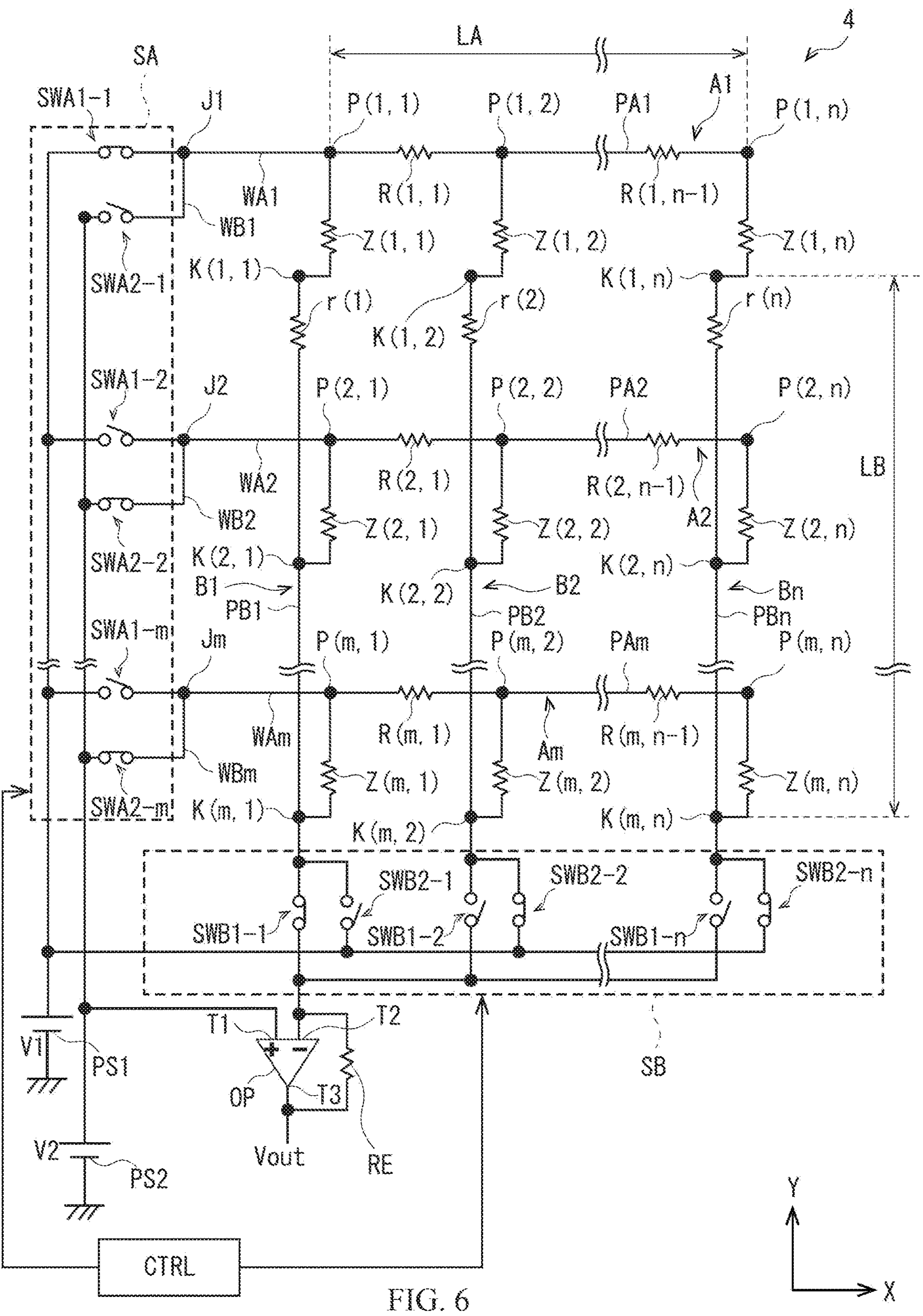
FIG. 6 is a circuit diagram illustrating a configuration example of an element array circuit according to one example embodiment of the disclosure.

FIG. 6 is a circuit diagram schematically illustrating an overall configuration example of an element array circuit 4 according to a fourth example embodiment of the disclosure. As illustrated in FIG. 6, the element array circuit 4 may have a configuration different from the configuration of the element array circuit 1 of FIG. 1 in that a single operational amplifier OP and a single resistor RE are provided for the readout lines B and that a readout line selector SB is further provided. In the element array circuit 4, the readout lines B may partly share their respective parts coupling the second parts PB to the operational amplifier OP. The following description will thus focus on the readout line selector SB, and descriptions of the other components will be omitted as appropriate. Note that although FIG. 6 illustrates an example state where "m" power feeding lines A are provided, any number of power feeding lines A may be provided. Similarly, although FIG. 6 illustrates the example state where "n" readout lines B are provided, any number of readout lines B may be provided. Further, in the example embodiment illustrated in FIG. 6, a set of one resistor RE and one operational amplifier OP may be provided for the "n" readout lines B; however, two or more sets of one resistor RE and one operational amplifier OP may be provided for the "n" readout lines B. Further, the element array circuit 4 of FIG. 6 may also have a configuration in which the number (n) of the readout lines B is smaller than the number (m) of the power feeding lines A.

Readout Line Selector SB

As illustrated in FIG. 6, the readout line selector SB may include switches SWB1 (SWB1-1 to SWB1-*n*) and switches SWB2 (SWB2-1 to SWB2-*n*). The switches SWB1 (SWB1-1 to SWB1-*n*) and the switches SWB2 (SWB2-1 to SWB2-*n*) may each be switchable between the conducting state and the nonconducting state. The switches SWB1 (SWB1-1 to SWB1-*n*) may each be provided at a point between the negative input terminal T2 of the operational amplifier OP and the node K(m, b) on corresponding one of the readout lines B (B1 to Bn). The switches SWB2 (SWB2-1 to SWB2-*n*) may each be provided between the direct-current power supply PS1 and the node K(m, b).

The readout line selector SB may select one readout line B from among the readout lines B. For convenience, the one readout line B selected from among the readout lines B will be referred to as a selected readout line BS. The readout line selector SB may couple the second part PB of the selected readout line BS to the negative input terminal T2 of the operational amplifier OP. For convenience, the readout lines B other than the selected readout line BS will each be referred to as an unselected readout line BU. The readout line selector SB may couple the second parts PB of the unselected readout lines BU to the direct-current power supply PS1 via the switches SWB2 (SWB2-1 to SWB2-*n*). Operation of the readout line selector SB may be controlled by the processor CTRL. For example, a switching operation of the readout line selector SB on each of the switches SWB1 (SWB1-1 to SWB1-*n*) and each of the switches SWB2 (SWB2-1 to SWB2-*n*) may be executed based on a command from the processor CTRL.

Measurement Operation in Element Array Circuit 4

In the element array circuit 4, it is possible to perform measurement on each of the resistors Z in the following manner, for example. The following measurement operation may be performed in accordance with a command from the processor CTRL.

First, the power feeding line A corresponding to the selected resistor ZS targeted for measurement may be selected to be the selected power feeding line AS. In one example, this process may be performed in a manner similar to the corresponding process in the measurement operation of the element array circuit 1 described in relation to the first example embodiment.

Thereafter, the readout line B corresponding to the selected resistor ZS targeted for the measurement may be selected to be the selected readout line BS. In one example, the switch SWB1 coupled to the selected readout line BS to which the selected resistor ZS is coupled may be caused to be in the conducting state to thereby couple the second part PB of the selected readout line BS to the operational amplifier OP. The other switches SWB1 corresponding to the unselected readout lines BU may be caused to be in the nonconducting state. Further, the switches SWB2 corresponding to the unselected readout lines BU may be caused to be in the conducting state and the first voltage V1 may be applied to the second parts PB of the unselected readout lines BU. The switch SWB2 corresponding to the selected readout line BS may be caused to be in the nonconducting state. FIG. 6 illustrates an example state where the resistor Z(1, 1) is selected to be the selected resistor ZS. In this case, the switch SWB1-1 corresponding to the readout line B1 as the selected readout line BS may be caused to be in the conducting state to thereby cause the second part PB1 of the readout line B1 to be electrically continuous with the operational amplifier OP. The switches SWB1-2 to SWB1-*n* corresponding to the readout lines B2 to Bn as the unselected readout lines BU may be caused to be in the nonconducting state. Further, the switches SWB2-2 to SWB2-*n* corresponding to the readout lines B2 to Bn as the unselected readout lines BU may be caused to be in the conducting state and the first voltage V1 may be applied to the second parts PB2 to PBn of the readout lines B2 to Bn. The switch SWB2-1 corresponding to the readout line B1 as the selected readout line BS may be caused to be in the nonconducting state. The potential Vf (Vf1) at the node P (P(1, 1)) to which the selected resistor ZS (the resistor Z(1, 1)) is coupled may be different from a potential at the node K (K(1, 1)) to which the selected resistor ZS is coupled and that corresponds to the node P(1, 1), that is, a potential at the selected readout line BS. The potential at the node K to which the selected resistor ZS is coupled, that is, the potential at the selected readout line BS, may be substantially equal to the second voltage V2 that is the potential at the negative input terminal T2.

Thereafter, the output voltage corresponding to each selected resistor ZS may be measured. In one example, the output voltage may be measured that results from the selected resistor ZS coupled to both the selected power feeding line AS and the selected readout line BS and that is outputted from the output terminal T3 of the operational amplifier OP. In the example embodiment of FIG. 6, the output voltage Vout may be measured that results from the resistor Z(1, 1) coupled to both the power feeding line A1 and the readout line B1 and that is outputted from the output terminal T3 of the operational amplifier OP. The output voltage Vout may be expressed by Expression (9) or Expression (10) described in relation to the first example embodiment.

Example Workings and Example Effects of Element Array Circuit 4

The element array circuit 4 according to the present example embodiment helps to achieve effects similar to the effects achievable with the element array circuit 1 according to the foregoing first example embodiment.

Furthermore, in the element array circuit 4 according to the present example embodiment, the readout lines B are each selectively couplable to the single operational amplifier OP through the use of the readout line selector SB. This helps to achieve further downsizing of the element array circuit, as compared with the element array circuit 1 of the foregoing first example embodiment that includes the multiple operational amplifiers OP.

5. Fifth Example Embodiment

Figure 7:
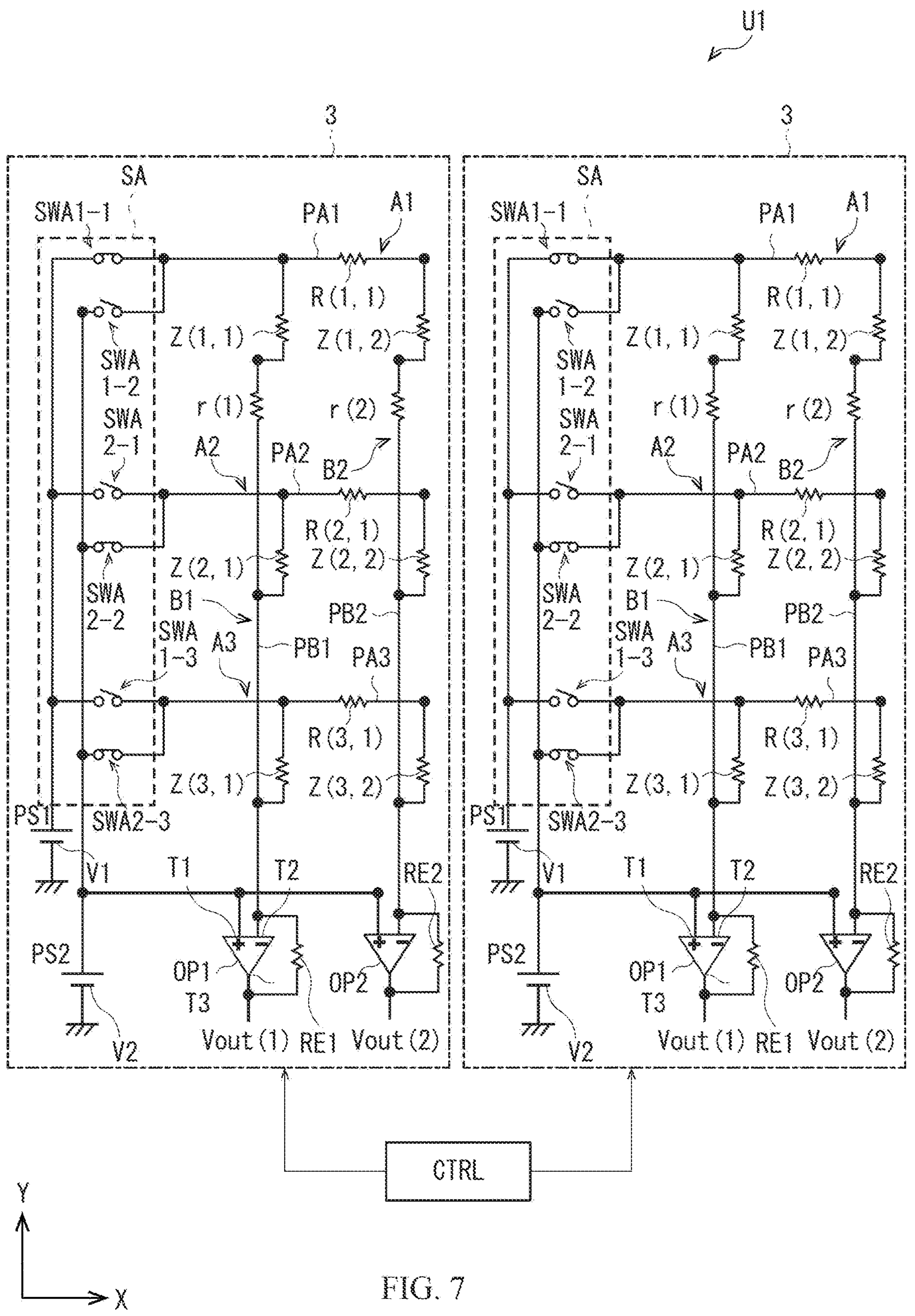
FIG. 7 is a circuit diagram illustrating a configuration example of an element array circuit unit according to one example embodiment of the disclosure.

FIG. 7 is a circuit diagram schematically illustrating an overall configuration example of an element array circuit unit U1 according to a fifth example embodiment of the disclosure. The element array circuit unit U1 illustrated in FIG. 7 includes a plurality of element array circuits 3. The element array circuits 3 are disposed side by side in the direction (e.g., the X-axis direction) in which each of the first parts PA extends. In the configuration example illustrated in FIG. 7, the element array circuit unit U1 may include two element array circuits 3 each illustrated in FIG. 5. Note that the element array circuit unit U1 may include three or more element array circuits 3 disposed side by side in the X-axis direction. In the configuration example of the element array circuit unit U1 illustrated in FIG. 7, the direct-current power supplies PS1 and PS2 may be provided inside each of the element array circuits 3; however, the direct-current power supplies PS1 and PS2 may be provided outside each of the element array circuits 3. Moreover, the element array circuits to be included in the element array circuit unit U1 are not limited to the element array circuits 3. In some embodiments, the element array circuit unit U1 may include a plurality of element array circuits 1, or may include a plurality of element array circuits 2.

6. Sixth Example Embodiment

Figure 8:
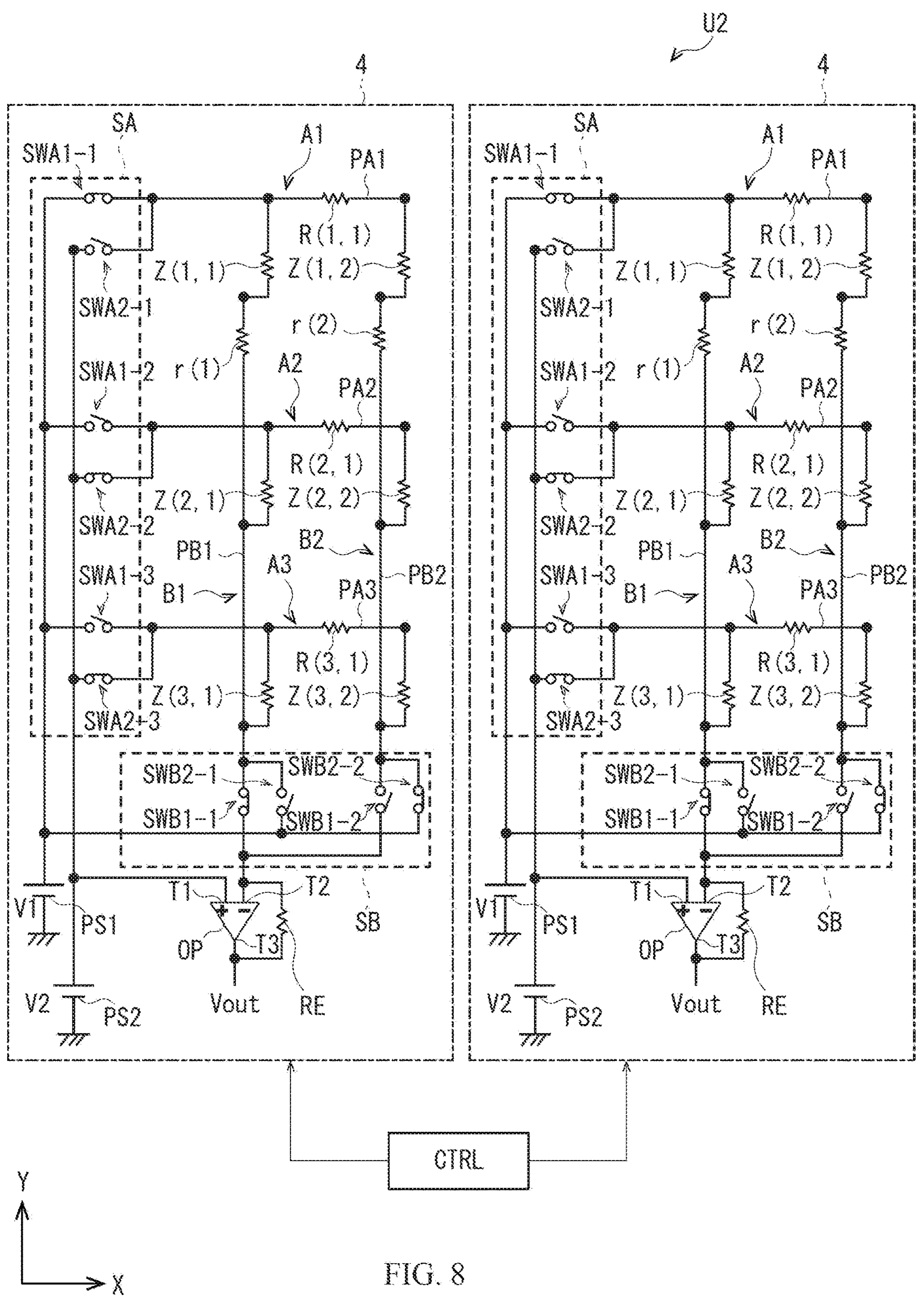
FIG. 8 is a circuit diagram illustrating a configuration example of an element array circuit unit according to one example embodiment of the disclosure.

FIG. 8 is a circuit diagram schematically illustrating an overall configuration example of an element array circuit unit U2 according to a sixth example embodiment of the disclosure. The element array circuit unit U2 illustrated in FIG. 8 includes a plurality of element array circuits 4. The element array circuits 4 are disposed side by side in the direction (e.g., the X-axis direction) in which each of the first parts PA extends. In the configuration example illustrated in FIG. 8, the element array circuit unit U2 may include two element array circuits 4 each illustrated in FIG. 6. Note that in each of the element array circuits 4 in the element array circuit unit U2 illustrated in FIG. 8, the number of the readout lines B may be smaller than the number of the power feeding lines A. In one example, the number of the power feeding lines A may be three and the number of the readout lines B may be two. Note that the element array circuit unit U2 may include three or more element array circuits 4 disposed side by side in the X-axis direction. In the configuration example of the element array circuit unit U2 illustrated in FIG. 8, the direct-current power supplies PS1 and PS2 may be provided inside each of the element array circuits 4; however, the direct-current power supplies PS1 and PS2 may be provided outside each of the element array circuits 4.

7. Seventh Example Embodiment

Figure 9:
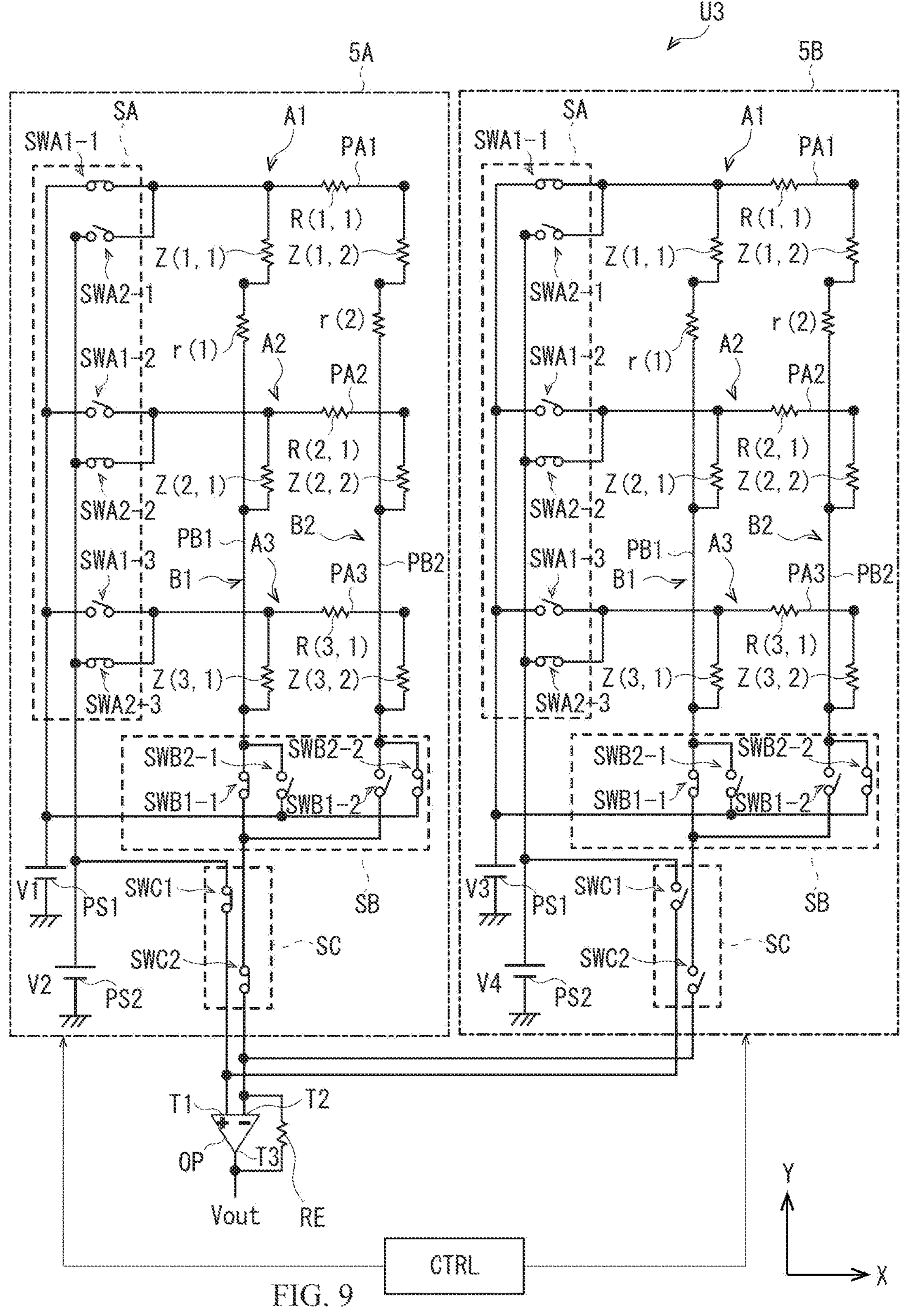
FIG. 9 is a circuit diagram illustrating a configuration example of an element array circuit unit according to one example embodiment of the disclosure.

FIG. 9 is a circuit diagram schematically illustrating an overall configuration example of an element array circuit unit U3 according to a seventh example embodiment of the disclosure. The element array circuit unit U3 illustrated in FIG. 9 includes a plurality of element array circuits 5. The element array circuits 5 are arranged in the direction (e.g., the X-axis direction) in which each of the first parts PA extends. In the configuration example illustrated in FIG. 9, the element array circuit unit U3 may include two element array circuits 5A and 5B. Note that the element array circuit unit U3 may include three or more element array circuits 5 disposed side by side in the X-axis direction.

In the element array circuit unit U3, the element array circuit 5A and the element array circuit 5B may share a single operational amplifier OP and a single resistor RE. Accordingly, the element array circuits 5A and 5B may each further include a circuit selector SC. The element array circuits 5A and 5B may each have a configuration that is otherwise substantially the same as the configuration of the element array circuit 4 included in the element array circuit unit U2 illustrated in FIG. 8. In the element array circuits 5A and 5B of the element array circuit unit U3 illustrated in FIG. 9, the number of the readout lines B may thus be smaller than the number of the power feeding lines A. In one example, the number of the power feeding lines A may be three and the number of the readout lines B may be two. The circuit selector SC may include one switch SWC1 and one switch SWC2. The switches SWC1 and SWC2 may each be switchable between the conducting state and the nonconducting state. The switch SWC1 may be provided between the positive input terminal T1 of the operational amplifier OP and the direct-current power supply PS2. The switch SWC2 may be provided between the readout line selector SB and the negative input terminal T2 of the operational amplifier OP.

A combination of the circuit selector SC and the readout line selector SB upstream from the circuit selector SC may correspond to a specific but non-limiting example of a "second wiring selector" in one embodiment of the disclosure.

The circuit selector SC may select one element array circuit from among the plurality of element array circuits. For convenience, the one element array circuit selected from among the plurality of element array circuits will be referred to as a selected circuit CS. The circuit selector SC may couple the selected circuit CS to the negative input terminal T2 of the operational amplifier OP, and may couple the direct-current power supply PS2 to the positive input terminal T1 of the operational amplifier OP. The direct-current power supply PS2 may apply the second voltage V2 to the first parts PA of the unselected power feeding lines AU of the selected circuit CS. Note that in FIG. 9, for the element array circuit 5A, the voltage of the direct-current power supply PS1 may be set to the first voltage V1 and the voltage of the direct-current power supply PS2 may be set to the second voltage V2 not equal to the first voltage V1, whereas for the element array circuit 5B, the voltage of the direct-current power supply PS1 may be set to a third voltage V3 and the voltage of the direct-current power supply PS2 may be set to a fourth voltage V4 not equal to the third voltage V3. Alternatively, for the element array circuit 5B, the voltage of the direct-current power supply PS1 may be set to the first voltage V1 and the voltage of the direct-current power supply PS2 may be set to the second voltage V2. Operation of the circuit selector SC may be controlled by the processor CTRL. For example, a switching operation of the circuit selector SC on each of the switches SWC1 and SWC2 may be executed based on a command from the processor CTRL.

In the element array circuit unit U3, as described above, the element array circuits may share the single operational amplifier OP and the single resistor RE. The number of the operational amplifiers OP is thus reduced as compared with the element array circuit unit U1 of FIG. 7, for example. This helps to achieve further downsizing.

8. Eighth Example Embodiment

Figure 10:
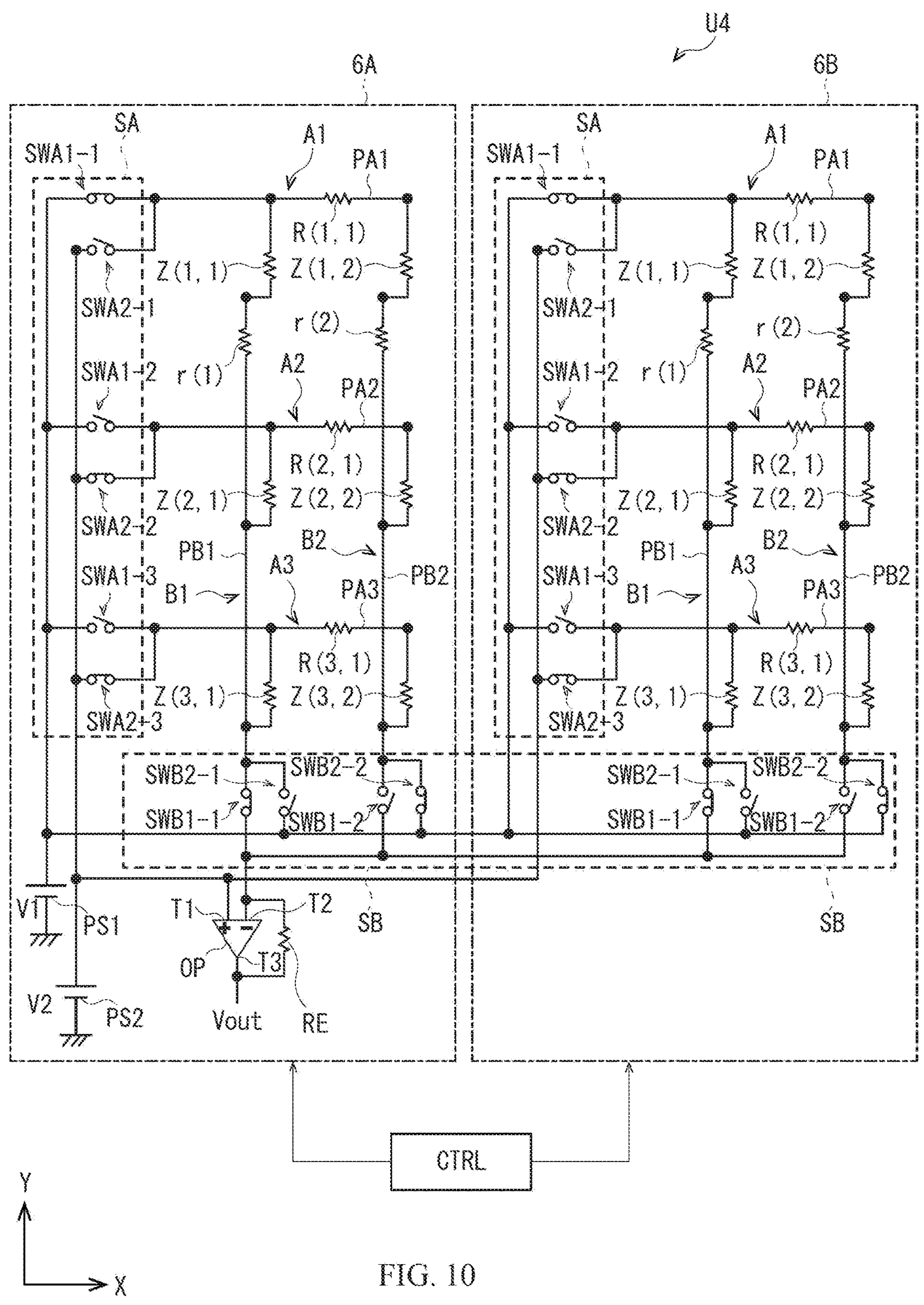
FIG. 10 is a circuit diagram illustrating a configuration example of an element array circuit unit according to one example embodiment of the disclosure.

FIG. 10 is a circuit diagram schematically illustrating an overall configuration example of an element array circuit unit U4 according to an eighth example embodiment of the disclosure. The element array circuit unit U4 illustrated in FIG. 10 includes a plurality of element array circuits 6. The element array circuits 6 are disposed side by side in the direction (e.g., the X-axis direction) in which each of the first parts PA extends. In the configuration example illustrated in FIG. 10, the element array circuit unit U4 may include two element array circuits 6, that is, element array circuits 6A and 6B. Note that the element array circuit unit U4 may include three or more element array circuits 6 disposed side by side in the X-axis direction.

In the element array circuit unit U4, the two element array circuits 6A and 6B adjacent to each other may share a single readout line selector SB, a single operational amplifier OP, a single direct-current power supply PS1, and a single direct-current power supply PS2. The element array circuits 6A and 6B may each have a configuration that is otherwise substantially the same as the configuration of the element array circuit 4 illustrated in FIG. 6. In the element array circuits 6A and 6B of the element array circuit unit U4 illustrated in FIG. 10, however, the number of the readout lines B may be smaller than the number of the power feeding lines A. In one example, the number of the power feeding lines A may be three and the number of the readout lines B may be two. In the configuration example of the element array circuit unit U4 illustrated in FIG. 10, the direct-current power supplies PS1 and PS2 and the operational amplifier OP may be provided inside the element array circuit 6A; however, the direct-current power supplies PS1 and PS2 and the operational amplifier OP may be provided inside the element array circuit 6B. Alternatively, the direct-current power supplies PS1 and PS2 may be provided outside the element array circuits 6A and 6B.

The readout line selector SB may correspond to a specific but non-limiting example of the "second wiring selector" in one embodiment of the disclosure.

In the element array circuit unit U4, as described above, the readout lines B in each of the element array circuits 6 are each selectively couplable to the single operational amplifier OP through the use of the single readout line selector SB. This helps to achieve further downsizing of the element array circuit unit, as compared with the element array circuit unit U2 of FIG. 8, for example.

9. Ninth Example Embodiment

An electromagnetic wave sensor 100A illustrated in FIGS. 11 to 16, for example, will be described as a ninth example embodiment of the disclosure. The electromagnetic wave sensor 100A may be a sensor device including the element array circuit according to an embodiment of the disclosure.

Figure 11:
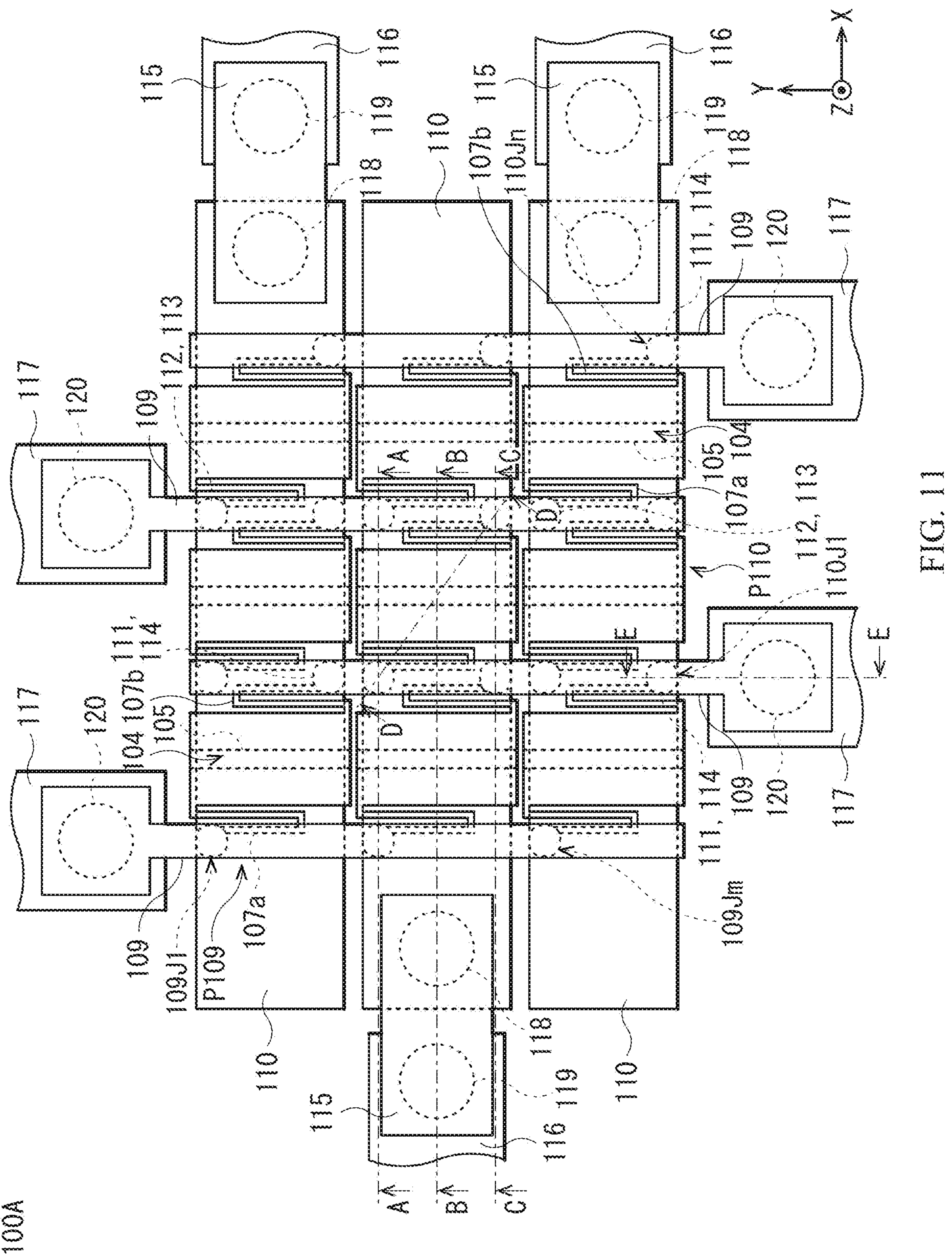
FIG. 11 is a plan diagram illustrating a configuration example of an electromagnetic wave sensor according to one example embodiment of the disclosure.
Figure 12:
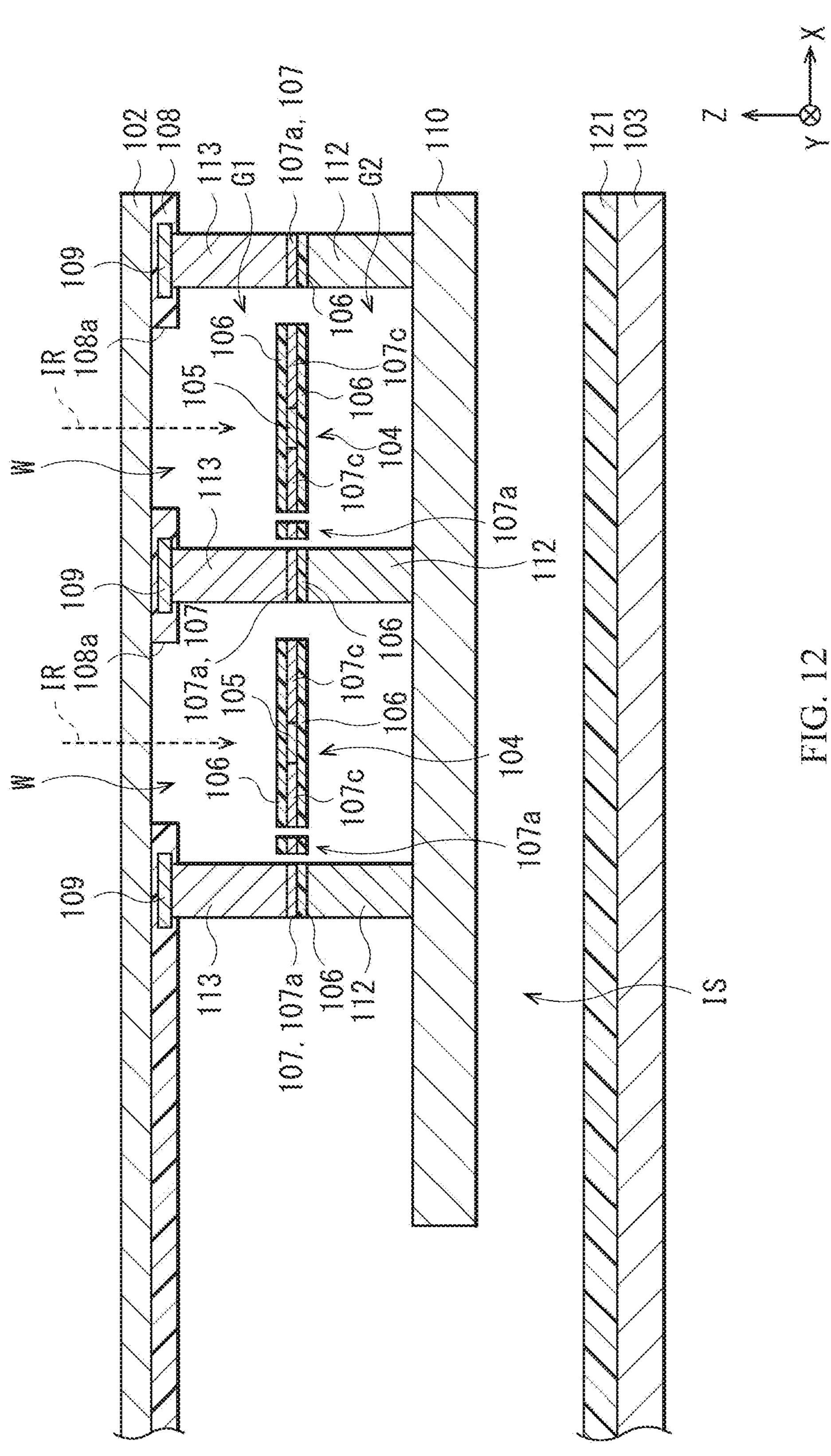
FIG. 12 is a cross-sectional view of the electromagnetic wave sensor taken along line A-A illustrated in FIG. 11.
Figure 13:
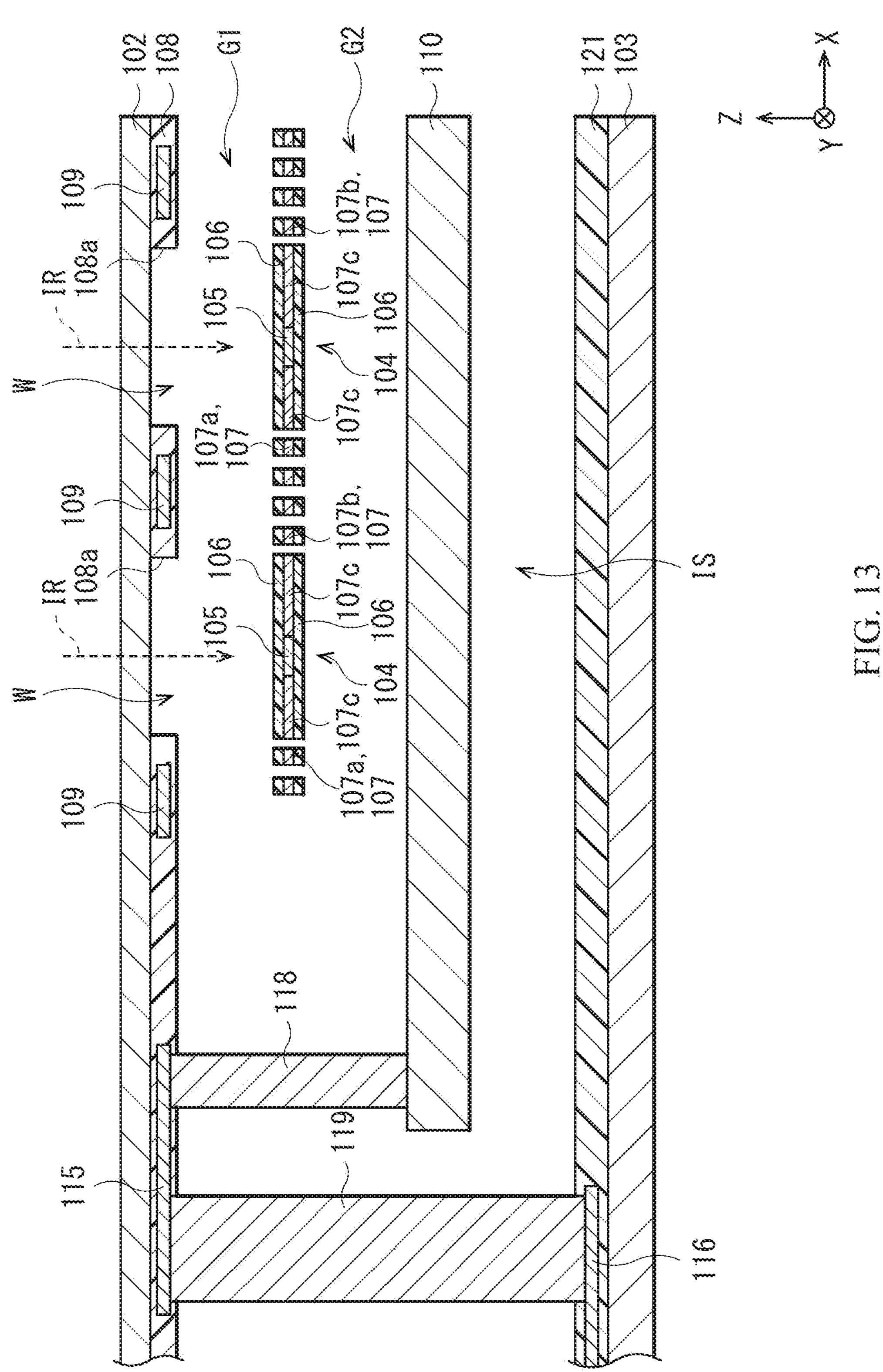
FIG. 13 is a cross-sectional view of the electromagnetic wave sensor taken along line B-B illustrated in FIG. 11.
Figure 14:
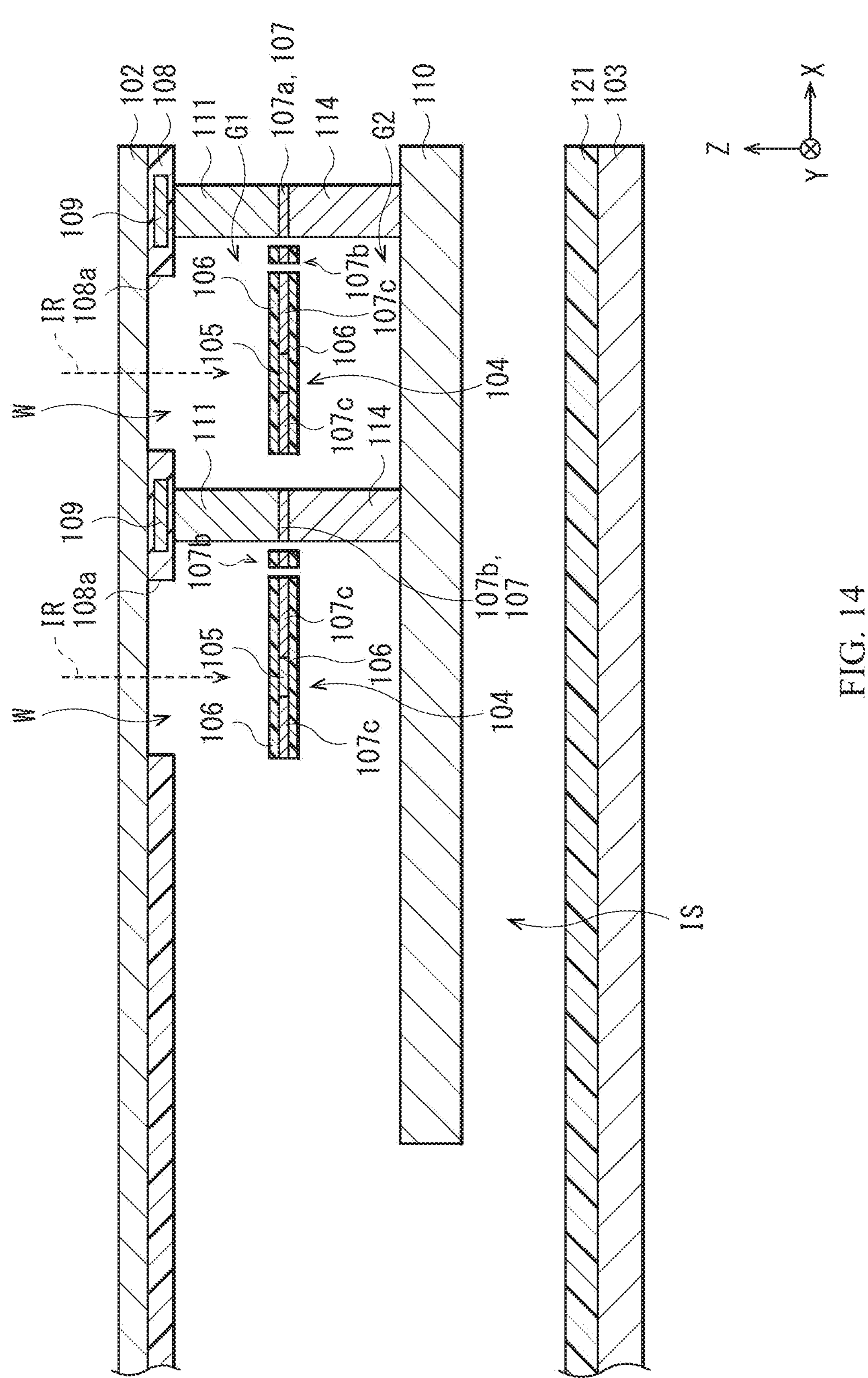
FIG. 14 is a cross-sectional view of the electromagnetic wave sensor taken along line C-C illustrated in FIG. 11.
Figure 15:
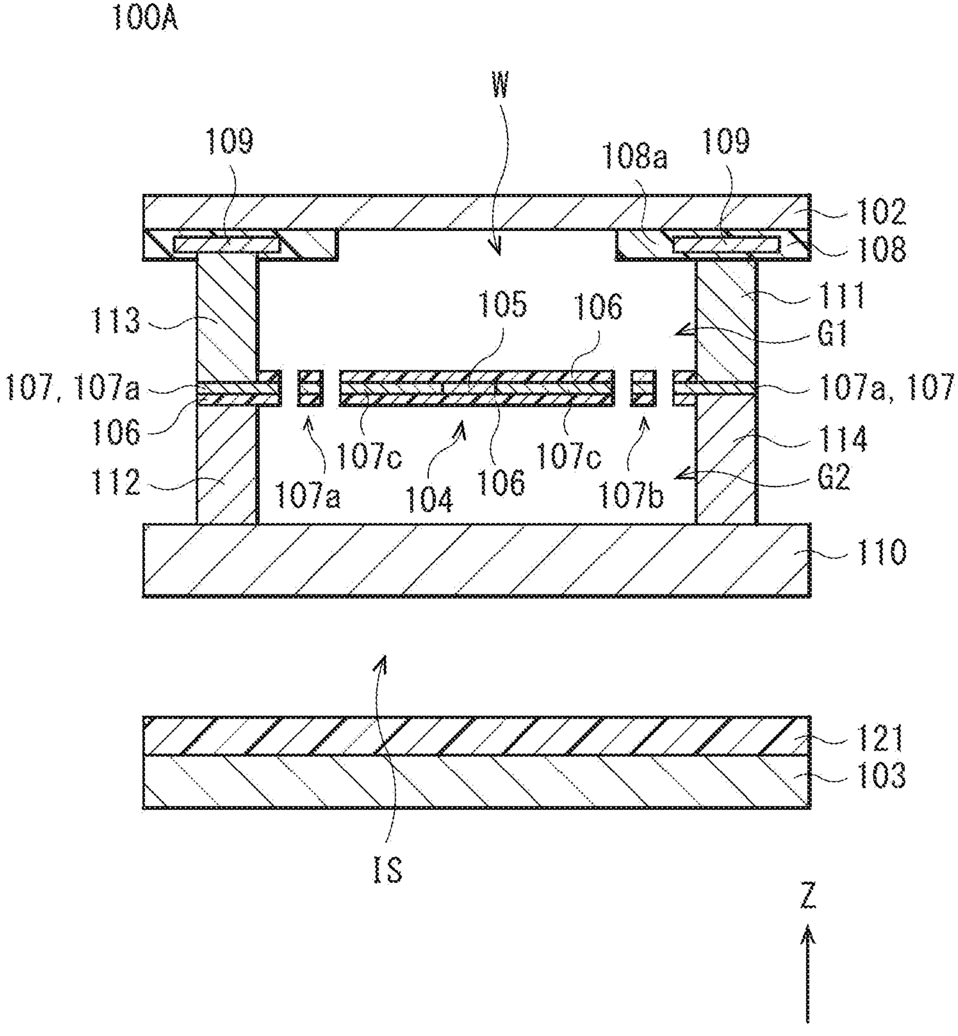
FIG. 15 is a cross-sectional view of the electromagnetic wave sensor taken along line D-D illustrated in FIG. 11.
Figure 16:
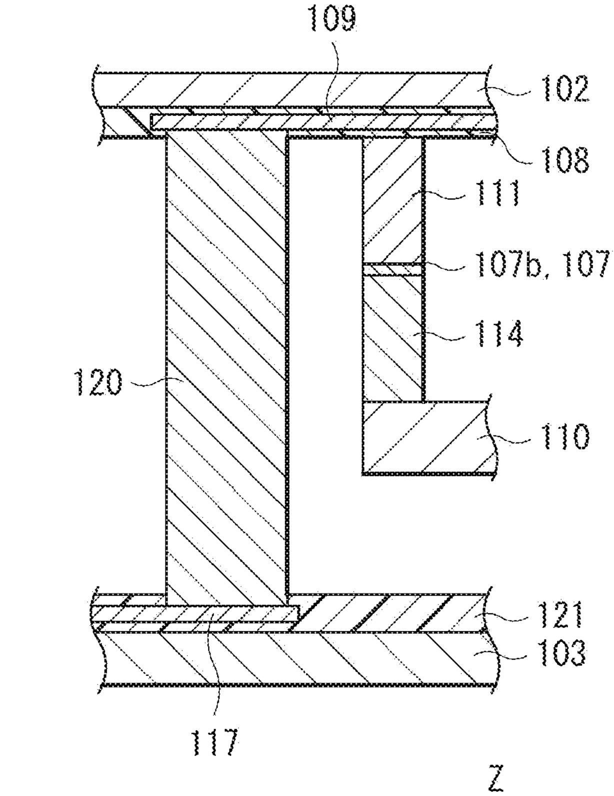
FIG. 16 is a cross-sectional view of the electromagnetic wave sensor taken along line E-E illustrated in FIG. 11.

FIG. 11 is a plan diagram illustrating an example configuration of the electromagnetic wave sensor 100A. FIG. 12 is a cross-sectional view of the electromagnetic wave sensor 100A taken along line A-A illustrated in FIG. 11. FIG. 13 is a cross-sectional view of the electromagnetic wave sensor 100A taken along line B-B illustrated in FIG. 11. FIG. 14 is a cross-sectional view of the electromagnetic wave sensor 100A taken along line C-C illustrated in FIG. 11. FIG. 15 is a cross-sectional view of the electromagnetic wave sensor 100A taken along line D-D illustrated in FIG. 11. FIG. 16 is a cross-sectional view of the electromagnetic wave sensor 100A taken along line E-E illustrated in FIG. 11.

The electromagnetic wave sensor 100A according to the present example embodiment may be an infrared imaging device, or an infrared image sensor that two-dimensionally detects or images a temperature distribution of a measurement target by detecting infrared rays emitted from the measurement target.

The infrared rays may be electromagnetic waves having a wavelength within a range from 0.75 μm to 1000 μm both inclusive. The infrared image sensor is usable as an infrared camera for indoor or outdoor night vision, for example, and is also usable as a noncontact temperature sensor to perform temperature measurements on humans or objects.

In one example, as illustrated in FIGS. 11 to 16, the electromagnetic wave sensor 100A may include a first substrate 102 and a second substrate 103 opposed to each other, and thermistor elements 104 disposed between the first substrate 102 and the second substrate 103.

The first substrate 102 and the second substrate 103 may each be a silicon substrate or a germanium substrate that is transmissive to electromagnetic waves having a specific wavelength. Non-limiting examples of such electromagnetic waves may include infrared rays IR having a wavelength band including a wavelength of 10 μm. In the present example embodiment, the infrared rays IR may be long-wavelength infrared rays having a wavelength of 8 to 14 μm.

The electromagnetic wave sensor 100A according to the present example embodiment may be configured to allow detection-target electromagnetic waves, i.e., the infrared rays IR, emitted from a measurement target to enter the electromagnetic wave sensor 100A from a first substrate 102 side. The first substrate 102 may thus allow the detection-target electromagnetic waves to pass through.

The first substrate 102 and the second substrate 103 may be sealed at the periphery of their mutually opposed surfaces with an unillustrated sealing material. The first substrate 102 and the second substrate 103 may thus define an internal space IS that is sealed between their mutually opposed surfaces. The internal space IS may be decompressed.

The electromagnetic wave sensor 100A according to the present example embodiment thus helps to suppress an influence of heat caused by convection in the internal space IS, and to thereby avoid the influence of heat other than the heat of the infrared rays IR emitted from the measurement target to the thermistor elements 104.

Note that possible configurations of the electromagnetic wave sensor 100A according to the present example embodiment are not limited to the above-described configuration in which the internal space IS is sealed and decompressed. In some embodiments, the electromagnetic wave sensor 100A may have a configuration with the internal space IS sealed or open at atmospheric pressures.

The first substrate 102 may have a substrate surface parallel to an XY plane including a first direction X and a second direction Y. Thus, the first direction X may be parallel to the substrate surface of the first substrate 102, and the second direction Y may also be parallel to the substrate surface of the first substrate 102.

The thermistor elements 104 may each be an electromagnetic wave detector to detect the infrared rays IR, and may each include a thermistor film 105 and an insulating film 106. The thermistor film 105 may serve as a temperature detecting element. The insulating film 106 may cover all or a part of the thermistor film 105 and serve as an electromagnetic wave absorber. In the present example embodiment, the insulating film 106 may cover all of the thermistor film 105.

Non-limiting examples of a material usable as the thermistor film 105 may include vanadium oxide, amorphous silicon, polycrystalline silicon, a manganese-containing oxide having a spinel crystal structure, titanium oxide, and yttrium-barium-copper oxide.

Non-limiting examples of a material usable as the insulating film 106 may include aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, and sialon, i.e., an oxynitride of silicon and aluminum.

The thermistor elements 104 may each have a current-perpendicular-to-plane (CPP) structure in which a current flows in a direction perpendicular to the plane of the thermistor film 105. For example, although not illustrated, the thermistor elements 104 may each include two first electrodes provided in contact with a first surface of the thermistor film 105, and a second electrode provided in contact with a second surface of the thermistor film 105. The thermistor elements 104 may each be configured to allow a current to be fed in the direction perpendicular to the plane of the thermistor film 105 from one of the first electrodes to the second electrode, and to allow a current to be fed in the direction perpendicular to the plane of the thermistor film 105 from the second electrode to the other of the first electrodes.

However, possible structures of the thermistor elements 104 are not limited to the CPP structure. In some embodiments, the thermistor elements 104 may each have a current-in-plane (CIP) structure with the second electrode omitted. In the CIP structure, a current flows between the two first electrodes in an in-plane direction of the thermistor film 105.

The insulating film 106 may simply be provided to cover all or a part of the thermistor film 105. In the present example embodiment, the insulating film 106 may be provided to cover each of both surfaces of the thermistor film 105.

The thermistor elements 104 may be of the same size. The thermistor elements 104 may be arranged in a two-dimensional array form in a plane parallel to the substrate surface of the first substrate 102. The plane parallel to the substrate surface of the first substrate 102 will hereinafter be referred to as a specific plane. For example, the thermistor elements 104 may be disposed side by side in a matrix in the first direction X and the second direction Y intersecting each other in the specific plane as seen in a plan view from a direction (a third direction Z) perpendicular to the substrate surface of the first substrate 102. In the present example embodiment, the first direction X and the second direction Y may be orthogonal to each other in the specific plane. Note that the first direction X and the second direction Y do not necessarily have to be orthogonal to each other in the specific plane.

Assuming that the first direction X is a row direction and the second direction Y is a column direction, the thermistor elements 104 may be disposed side by side at regular spacings in the first direction X and disposed side by side at regular spacings in the second direction Y.

Non-limiting examples of the numbers of rows and columns of the above-described thermistor elements 104 may include 640 rows by 480 columns and 1024 rows by 768 columns. However, the numbers of rows and columns are not limited to such examples and may be changed as appropriate.

In a region in which each thermistor film 105 and the first substrate 102 are opposed each other in a thickness direction, i.e., a region in which each thermistor film 105 and the first substrate 102 overlap each other in a plan view, there may be a window W that allows the infrared rays IR to pass therethrough between the first substrate 102 and the thermistor film 105. In the window W, a later-described first insulator layer 108 provided on the substrate surface of the first substrate 102 may be removed in part. In other words, the window W may have a hole *8a* extending through the first insulator layer 108 in a region overlapping each thermistor element 104 in a plan view.

Two arms **107*a* and 107*b* may be coupled to each thermistor element 104. The arms 107*a* and 107*b* may be electrically coupled to the thermistor film 105. The arms 107*a* and 107*b* may each include a wiring layer 107 and the insulating film 106. The wiring layer 107 may have a linear shape and may be electrically coupled to the two first electrodes described above. The insulating film 106 may be provided to cover each of both surfaces of the wiring layer 107**.

The wiring layer 107 may include an electrically conductive film including at least one material selected from among, for example, aluminum, gold, silver, copper, tungsten, titanium, tantalum, chromium, silicon, titanium nitride, tantalum nitride, chromium nitride, tungsten nitride, and zirconium nitride.

The two arms 107_a_ and 107_b_ may be located on opposite sides with the thermistor element 104 interposed therebetween, as seen in a plan view from the third direction Z. The arms 107_a_ and 107_b_ may each include at least a part extending along a perimeter of the thermistor element 104 and a part coupled to the thermistor element 104.

In one example, the arms 107_a_ and 107_b_ of the present example embodiment may have a structure in which multiple parts (e.g., two parts in the present example embodiment) extending in the second direction Y are disposed side by side in the first direction X, with a first end and a second end of mutually adjacent parts being coupled to each other via a part extending in the first direction X. In other words, the arms 107_a_ and 107_b_ of the present example embodiment may each have a structure in which the parts extending in the second direction Y is folded back at the part extending in the first direction X.

The two arms 107_a_ and 107_b_ may be located to allow the thermistor element 104 to be interposed therebetween, and may each be coupled to the thermistor element 104 via the part extending in the first direction X. The wiring layer 107 may be coupled to an electrically conductive layer 107_c_ located on each of opposite sides of the thermistor film 105. The materials exemplified above for the wiring layer 107 may be used for the electrically conductive layer 107_c_. Although not illustrated, the wiring layer 107 included in the arm 107_a_ may be electrically coupled to the thermistor film 105 via the electrically conductive layer 107_c_ and one of the above-described first electrodes, and the wiring layer 107 included in the arm 107_b_ may be electrically coupled to the thermistor film 105 via the electrically conductive layer 107_c_ and the other of the above-described first electrodes. In the present example embodiment, the electrically conductive layer 107_c_ may constitute part of the thermistor element 104.

The first insulator layer 108 and second wirings 109 may be provided on the side of a surface, of the first substrate 102, facing toward the second substrate 103.

The first insulator layer 108 may include an insulating film provided on the side of one surface, i.e., the surface facing toward the second substrate 103, of the first substrate 102. Non-limiting examples of a material usable as the insulating film may include aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, and sialon, i.e., an oxynitride of silicon and aluminum.

The second wirings 109 may each include an electrically conductive film including, for example, copper or gold, and may include respective second parts P109. The second parts P109 may each extend in the second direction Y parallel to the substrate surface of the first substrate 102 as seen in a plan view from the direction perpendicular to the substrate surface, i.e., from the third direction Z. The second parts P109 may be provided side by side at regular spacings in the first direction X. The second parts P109 may be respective parts, of the second wirings 109, each extending from a junction 109J1 of a third pillar 113 corresponding to a first one of the thermistor elements 104 in the second direction Y to a junction 109Jm of the third pillar 113 corresponding to an "m"-th one of the thermistor elements 104 in the second direction Y. See FIG. 11.

In the present example embodiment, the second wirings 109 may each be located within the first insulator layer 108. Note that at least a surface of each of the second wirings 109 may be exposed from the first insulator layer 108.

In the electromagnetic wave sensor 100A of the present example embodiment, the second wirings 109 may be located closer to the first substrate 102 than the thermistor elements 104 in the third direction Z. In the third direction Z, the second wirings 109 may be located between the thermistor elements 104 and the first substrate 102.

First wirings 110 may be provided on a side farther from the first substrate 102 than the thermistor elements 104 in the third direction Z. In the third direction Z, the thermistor elements 104 may be located between the first wirings 110 and the first substrate 102. The first wirings 110 may be disposed between the first substrate 102 and the second substrate 103. In other words, the second substrate 103 may be located farther from the first substrate 102 than the first wirings 110 in the third direction Z.

The first wirings 110 may each include an electrically conductive film including, for example, copper or gold, and may include respective first parts P110. The first parts P110 may each extend in the first direction X parallel to the substrate surface of the first substrate 102 as seen in a plan view from the third direction Z. The first parts P110 may be provided side by side at regular spacings in the second direction Y. The first parts P110 may be respective parts, of the first wirings 110, each extending from a junction 110J1 of a fourth pillar 114 corresponding to a first one of the thermistor elements 104 in the first direction X to a junction 110Jn of the fourth pillar 114 corresponding to an "n"-th one of the thermistor elements 104 in the first direction X. See FIG. 11.

Thus, the second wirings 109 and the first wirings 110 may be so disposed at different positions in the third direction Z as to three-dimensionally intersect each other. For example, the second wirings 109 may be spaced from the first wirings 110 in the third direction Z and disposed to three-dimensionally intersect the first wirings 110. Further, the first wirings 110 may be spaced from the second wirings 109 in the third direction Z and disposed to three-dimensionally intersect the second wirings 109.

The first wirings 110 may each include a part overlapping the thermistor element 104 as seen in a plan view from the third direction Z. This allows measurement-target electromagnetic waves (the infrared rays IR) having passed through the thermistor elements 104 to be reflected at the first wirings 110 and irradiate the thermistor elements 104 again, which helps to improve absorption efficiency for the electromagnetic waves.

The first parts P110 of the first wirings 110 may be greater in width than the second parts P109 of the second wirings 109 as seen in a plan view from the third direction Z. This helps to increase the above-described effect of improving the absorption efficiency for the electromagnetic waves, and helps to make the first parts P110 of the first wirings 110 smaller in electrical resistance value per unit length than the second parts P109 of the second wirings 109. Further, the first parts P110 may be greater in thickness in the third direction Z than the second parts P109. This helps to make the first parts P110 smaller in electrical resistance value per unit length than the second parts P109.

The electromagnetic wave sensor 100A according to the present example embodiment may include a first pillar 111, a second pillar 112, the third pillar 113, and the fourth pillar 114 that each extend in a direction including at least a component of the third direction Z. In the present example embodiment, the first to fourth pillars 111 to 114 may each extend in the third direction Z.

The first pillar 111 may include a conductor such as copper, gold, a FeCoNi alloy, or a NiFe alloy (permalloy). All or a part of the first pillar 111 may include an electrically conductive pillar having a circular shape in cross section. The electrically conductive pillar may be located between the first substrate 102 and the thermistor element 104 in the third direction Z and may extend in a direction including the component of the third direction Z. In the present example embodiment, the electrically conductive pillar may extend in the third direction Z.

The first pillar 111 may have a first end and a second end in the direction of extension of the first pillar 111, i.e., the third direction Z in the present example embodiment. In the present example embodiment, the first end may be an upper end, and the second end may be a lower end. The first end may be coupled to the first insulator layer 108 covering the second wiring 109, and the second end may be coupled to a leading end of the wiring layer 107 included in the arm 107*b*.

At least one of the ends of the first pillar 111 may be coupled to an insulator. In the present example embodiment, the upper end of the first pillar 111 may be coupled to the first insulator layer 108 as the insulator. As a result, in a path passing through the inside of the first pillar 111 from the first end to the second end of the first pillar 111, the thermistor element 104 or the thermistor film 105 may be electrically insulated from the second wiring 109 overlapping the first pillar 111 in a plan view from the third direction Z.

The second pillar 112 may include a conductor such as copper, gold, a FeCoNi alloy, or a NiFe alloy (permalloy). All or a part of the second pillar 112 may include an electrically conductive pillar having a circular shape in cross section. The electrically conductive pillar may be located between the first wiring 110 and the thermistor element 104 in the third direction Z and may extend in a direction including the component of the third direction Z. In the present example embodiment, the electrically conductive pillar may extend in the third direction Z.

The second pillar 112 may have a first end and a second end in the direction of extension of the second pillar 112, i.e., the third direction Z in the present example embodiment. In the present example embodiment, the first end may be a lower end, and the second end may be an upper end. The first end may be coupled to the first wiring 110, and the second end may be coupled to the insulating film 106 provided on a lower surface of the wiring layer 107 included in the arm 107*a*.

At least one of the ends of the second pillar 112 may be coupled to an insulator. In the present example embodiment, the upper end of the second pillar 112 may be coupled to the insulating film 106 as the insulator. As a result, in a path passing through the inside of the second pillar 112 from the first end to the second end of the second pillar 112, the thermistor element 104 or the thermistor film 105 may be electrically insulated from the first wiring 110.

The third pillar 113 may include a conductor such as copper, gold, a FeCoNi alloy, or a NiFe alloy (permalloy). All or a part of the third pillar 113 may include an electrically conductive pillar having a circular shape in cross section. The electrically conductive pillar may be located between the first substrate 102 and the thermistor element 104 in the third direction Z and may extend in a direction including the component of the third direction Z. In the present example embodiment, the electrically conductive pillar may extend in the third direction Z.

The second pillar 112 and the third pillar 113 may be located to entirely or partly overlap each other as seen in a plan view from the third direction Z. In the present example embodiment, the second pillar 112 and the third pillar 113 may be located to entirely overlap each other as seen in a plan view from the third direction Z. The third pillar 113 may have a first end and a second end in the direction of extension of the third pillar 113, i.e., the third direction Z in the present example embodiment. In the present example embodiment, the first end may be an upper end, and the second end may be a lower end. The first end may be coupled to the second wiring 109, and the second end may be coupled to a leading end of the wiring layer 107 of the arm 107*a*. As a result, the thermistor element 104 may be coupled to the first substrate 102 via at least the third pillar 113. In the present example embodiment, the thermistor element 104 may be coupled to the first substrate 102 via the arm 107*a*, the third pillar 113, the second wiring 109, and the first insulator layer 108.

Note that the first insulator layer 108 may be partly removed to allow the third pillar 113 and the second wiring 109 to be electrically coupled to each other. Further, the insulating film 106 provided on an upper surface of the wiring layer 107 included in the arm 107*a* may be partly removed to allow the third pillar 113 and the wiring layer 107 of the arm 107*a* to be electrically coupled to each other.

The thermistor element 104 and the two arms 107*a* and 107*b* may be supported in a state of being hung from the first substrate 102 in the third direction Z, by the first pillar 111 and the third pillar 113 located in a direction diagonal to the thermistor element 104 in a plan view from the third direction Z. This support structure achieves high mechanical strength by virtue of the two pillars, i.e., the first pillar 111 and the third pillar 113 supporting the thermistor element 104 and the arms 107*a* and 107*b* from the first substrate 102. The thermistor element 104 and the first insulator layer 108, i.e., the thermistor element 104 and the first substrate 102 may have a space G1 therebetween.

The third pillar 113 may be electrically conductive and electrically coupled to the second wiring 109 and the thermistor element 104. The thermistor element 104 or the thermistor film 105 may thus be electrically coupled to the second wiring 109 via at least the third pillar 113.

The fourth pillar 114 may include a conductor such as copper, gold, a FeCoNi alloy, or a NiFe alloy (permalloy). All or a part of the fourth pillar 114 may include an electrically conductive pillar having a circular shape in cross section. The electrically conductive pillar may be located between the first wiring 110 and the thermistor element 104 in the third direction Z and may extend in a direction including the component of the third direction Z. In the present example embodiment, the electrically conductive pillar may extend in the third direction Z.

The first pillar 111 and the fourth pillar 114 may be located to entirely or partly overlap each other as seen in a plan view from the third direction Z. In the present example embodiment, the first pillar 111 and the fourth pillar 114 may be located to entirely overlap each other as seen in a plan view from the third direction Z. The fourth pillar 114 may have a first end and a second end in the direction of extension of the fourth pillar 114, i.e., the third direction Z in the present example embodiment. In the present example embodiment, the first end may be a lower end, and the second end may be an upper end. The first end may be coupled to the first wiring 110, and the second end may be coupled to the leading end of the wiring layer 107 of the arm 107*b*. As a result, the first wiring 110 may be coupled to the thermistor element 104 via at least the fourth pillar 114. In the present example embodiment, the first wiring 110 may be coupled to the thermistor element 104 via the fourth pillar

114 and the arm 107*b*. Note that the insulating film 106 provided on the lower surface of the wiring layer 107 included in the arm 107*b* may be partly removed to allow the fourth pillar 114 and the wiring layer 107 of the arm 107*b* to be electrically coupled to each other.

By virtue of the two pillars, i.e., the second pillar 112 and the fourth pillar 114 supporting the first wiring 110 in a state of being coupled to the thermistor element 104 via the arms 107*a* and 107*b*, the support structure achieves high mechanical strength.

The first wiring 110 may be supported in a state of being hung from the first substrate 102 in the third direction Z, by a combination of the second and third pillars 112 and 113 and a combination of the first and fourth pillars 111 and 114 that are located in a direction diagonal to the thermistor element 104 in a plan view from the third direction Z. Further, the thermistor element 104 and the first wiring 110 may have a space G2 therebetween.

The fourth pillar 114 may be electrically conductive and electrically coupled to the first wiring 110 and the thermistor element 104. The thermistor element 104 or the thermistor film 105 may thus be electrically coupled to the first wiring 110 via at least the fourth pillar 114.

In the electromagnetic wave sensor 100A according to the present example embodiment, as seen in a plan view from the third direction Z, the second pillar 112 and the third pillar 113 may be located to entirely or partly overlap each other, and the first pillar 111 and the fourth pillar 114 may be located to entirely or partly overlap each other. In the present example embodiment, the second pillar 112 and the third pillar 113 may be located to entirely overlap each other as seen in a plan view from the third direction Z, and the first pillar 111 and the fourth pillar 114 may be located to entirely overlap each other as seen in a plan view from the third direction Z. This allows for high mechanical strength of the structure supporting the thermistor element 104 and the arms 107*a* and 107*b* or the first wiring 110.

In the electromagnetic wave sensor 100A according to the present example embodiment, the thermistor elements 104 may each be electrically coupled to corresponding one of the second wirings 109 via the third pillar 113, and may each be electrically coupled to corresponding one of the first wirings 110 via the fourth pillar 114.

The electromagnetic wave sensor 100A according to the present example embodiment may include third wirings 115, fourth wirings 116, fifth wirings 117, a fifth pillar 118, a sixth pillar 119, and a seventh pillar 120. The fifth pillar 118, the sixth pillar 119, and the seventh pillar 120 may extend in a direction including at least the component of the third direction Z. In the present example embodiment, the fifth to seventh pillars 118 to 120 may extend in the third direction Z.

The third wirings 115 may each include an electrically conductive film including, for example, copper or gold, and may be provided on the side of the surface, of the first substrate 102, facing toward the second substrate 103. In other words, the third wirings 115 may be located closer to the first substrate 102 than the first wirings 110 in the third direction Z. In the third direction Z, the third wirings 115 may be located between the first wirings 110 and the first substrate 102.

In the present example embodiment, the third wirings 115 may each be located within the first insulator layer 108. Note that at least a surface of each of the third wirings 115 may be exposed from the first insulator layer 108.

The third wirings 115 may each be electrically coupled to corresponding one of the first wirings 110. In a plan view from the third direction Z, the third wirings 115 may each extend in the first direction X, and may be provided side by side at regular spacings in the second direction Y.

In the example embodiment illustrated in FIGS. 11 and 13, the third wirings 115 may each be smaller in width than corresponding one of the first wirings 110 as seen in a plan view from the third direction Z. Further, in the example embodiment illustrated in FIGS. 11 and 13, the third wirings 115 may each be smaller in thickness in the third direction Z than corresponding one of the first wirings 110. The third wirings 115 may each include a part overlapping a first end side or a second end side of corresponding one of the first wirings 110 as seen in a plan view from the third direction Z. Further, as seen in a plan view from the third direction Z, the third wirings 115 may each extend, from the part overlapping the corresponding one of the first wirings 110, in a direction away from the corresponding one of the first wirings 110.

In the present example embodiment, in a plan view from the third direction Z, multiple ones of the third wirings 115 each overlapping the first end side of corresponding one of the first wirings 110 and multiple ones of the third wirings 115 each overlapping the second end side of corresponding one of the first wirings 110 may be alternately provided side by side in the second direction Y. Note that such a configuration is non-limiting and any of other suitable configurations may be employed, such as a configuration in which only the third wirings 115 each overlapping the first end side of corresponding one of the first wirings 110 are disposed side by side in the second direction Y or a configuration in which only the third wirings 115 each overlapping the second end side of corresponding one of the first wirings 110 are disposed side by side in the second direction Y.

The fifth pillar 118 may include a conductor such as copper, gold, a FeCoNi alloy, or a NiFe alloy (permalloy). All or a part of the fifth pillar 118 may include an electrically conductive pillar having a circular shape in cross section. The electrically conductive pillar may be located between the first wiring 110 and the first substrate 102 in the third direction Z and may extend in a direction including the component of the third direction Z. In the present example embodiment, the electrically conductive pillar may extend in the third direction Z. In the present example embodiment, the fifth pillar 118 may be located between the first wiring 110 and the third wiring 115.

The fifth pillar 118 may have a first end and a second end in the direction of extension of the fifth pillar 118, i.e., the third direction Z in the present example embodiment. In the present example embodiment, the first end may be a lower end, and the second end may be an upper end. The first end may be coupled to the first wiring 110, and the second end may be coupled to the third wiring 115. As a result, the first wiring 110 may be coupled to the first substrate 102 via at least the fifth pillar 118. In the present example embodiment, the first wiring 110 may be coupled to the first substrate 102 via the fifth pillar 118, the third wiring 115, and the first insulator layer 108. The first wiring 110 may be supported by the fifth pillar 118, in a state of being hung from the first substrate 102 in the third direction Z. In the present example embodiment, the fifth pillar 118 may be coupled to the first end side or the second end side of the first wiring 110. Note that the first insulator layer 108 may be partly removed to allow the fifth pillar 118 and the third wiring 115 to be electrically coupled to each other.

The fifth pillar 118 may be electrically conductive and electrically coupled to the first wiring 110 and the third wiring 115. The first wiring 110 may thus be electrically coupled to the third wiring 115 via at least the fifth pillar 118. As a result, the thermistor element 104 or the thermistor film 105 may be electrically coupled to the first wiring 110 via at least the fourth pillar 114, and electrically coupled to the third wiring 115 via at least the fourth pillar 114, the first wiring 110, and the fifth pillar 118.

The fourth wirings 116 may each include an electrically conductive film including, for example, copper or gold, and may be provided on the side of the surface, of the second substrate 103, facing toward the first substrate 102. In other words, the fourth wirings 116 may be located farther from the first substrate 102, or closer to the second substrate 103, than the first wirings 110 in the third direction Z.

A second insulator layer 121 may be provided on the side of the surface, of the second substrate 103, facing toward the first substrate 102. The second insulator layer 121 may include an insulating film provided on the side of one surface, i.e., the surface facing toward the first substrate 102, of the second substrate 103. The materials exemplified above for the first insulator layer 108 may be used for the insulating film.

In the present example embodiment, the fourth wirings 116 may each be located within the second insulator layer 121. Note that at least a surface of each of the fourth wirings 116 may be exposed from the second insulator layer 121.

The fourth wirings 116 may each be electrically coupled to corresponding one of the third wirings 115. In a plan view from the third direction Z, the fourth wirings 116 may each extend in the first direction X, and may be provided side by side at regular spacings in the second direction Y.

As seen in a plan view from the third direction Z, the fourth wirings 116 may each include a part overlapping corresponding one of the third wirings 115 at a side of the corresponding one of the third wirings 115 opposite to the side coupled to the fifth pillar 118. Further, as seen in a plan view from the third direction Z, the fourth wirings 115 may each extend, from the part overlapping the corresponding one of the third wirings 115, in a direction away from the corresponding one of the third wirings 115.

The sixth pillar 119 may include a conductor such as copper, gold, a FeCoNi alloy, or a NiFe alloy (permalloy). The sixth pillar 119 may include an electrically conductive pillar having a circular shape in cross section. The electrically conductive pillar may be located between the third wiring 115 and the fourth wiring 116 and may extend in a direction including the component of the third direction Z. In the present example embodiment, the electrically conductive pillar may extend in the third direction Z.

The sixth pillar 119 may have a first end and a second end in the direction of extension of the sixth pillar 119, i.e., the third direction Z in the present example embodiment. In the present example embodiment, the first end may be an upper end, and the second end may be a lower end. The first end may be coupled to the third wiring 115, and the second end may be coupled to the fourth wiring 116. Note that the second insulator layer 121 may be partly removed to allow the sixth pillar 119 and the fourth wiring 116 to be electrically coupled to each other.

The sixth pillar 119 may be electrically conductive and electrically coupled to the third wiring 115 and the fourth wiring 116. The third wiring 115 may thus be electrically coupled to the fourth wiring 116 via at least the sixth pillar 119. As a result, the thermistor element 104 or the thermistor film 105 may be electrically coupled to the first wiring 110 via at least the fourth pillar 114, electrically coupled to the third wiring 115 via at least the fourth pillar 114, the first wiring 110, and the fifth pillar 118, and electrically coupled to the fourth wiring 116 via at least the fourth pillar 114, the first wiring 110, the fifth pillar 118, the third wiring 115, and the sixth pillar 119.

The fifth wirings 117 may each include an electrically conductive film including, for example, copper or gold, and may be provided on the side of the surface, of the second substrate 103, facing toward the first substrate 102. In other words, the fifth wirings 117 may be located farther from the first substrate 102, or closer to the second substrate 103, than the first wirings 110 in the third direction Z.

In the present example embodiment, the fifth wirings 117 may each be located within the second insulator layer 121. Note that at least a surface of each of the fifth wirings 117 may be exposed from the second insulator layer 121.

The fifth wirings 117 may each be electrically coupled to corresponding one of the second wirings 109. In a plan view from the third direction Z, the fifth wirings 117 may each extend in the second direction Y, and may be provided side by side at regular spacings in the first direction X.

The fifth wirings 117 may each include a part overlapping a first end side or a second end side of corresponding one of the second wirings 109 as seen in a plan view from the third direction Z. Further, as seen in a plan view from the third direction Z, the fifth wirings 117 may each extend, from the part overlapping the corresponding one of the second wirings 109, in a direction away from the corresponding one of the second wirings 109.

In the present example embodiment, in a plan view from the third direction Z, multiple ones of the fifth wirings 117 each overlapping the first end side of corresponding one of the second wirings 109 and multiple ones of the fifth wirings 117 each overlapping the second end side of the corresponding one of the second wirings 109 may be alternately provided side by side in the first direction X. Note that such a configuration is non-limiting and any of other suitable configurations may be employed, such as a configuration in which only the fifth wirings 117 each overlapping the first end side of corresponding one of the second wirings 109 are disposed side by side in the first direction X or a configuration in which only the fifth wirings 117 each overlapping the second end side of corresponding one of the second wirings 109 are disposed side by side in the first direction X.

The seventh pillar 120 may include a conductor such as copper, gold, a FeCoNi alloy, or a NiFe alloy (permalloy). The seventh pillar 120 may include an electrically conductive pillar having a circular shape in cross section. The electrically conductive pillar may be located between the second wiring 109 and the fifth wiring 117 and may extend in a direction including the component of the third direction Z. In the present example embodiment, the electrically conductive pillar may extend in the third direction Z.

The seventh pillar 120 may have a first end and a second end in the direction of extension of the seventh pillar 120, i.e., the third direction Z in the present example embodiment. In the present example embodiment, the first end may be an upper end, and the second end may be a lower end. The first end may be coupled to the second wiring 109, and the second end may be coupled to the fifth wiring 117. Note that the second insulator layer 121 may be partly removed to allow the seventh pillar 120 and the fifth wiring 117 to be electrically coupled to each other.

The seventh pillar 120 may be electrically conductive and electrically coupled to the second wiring 109 and the fifth wiring 117. The second wiring 109 may thus be electrically coupled to the fifth wiring 117 via at least the seventh pillar 120. As a result, the thermistor element 104 or the thermistor film 105 may be electrically coupled to the second wiring 109 via at least the third pillar 113, and electrically coupled to the fifth wiring 117 via at least the third pillar 113, the second wiring 109, and the seventh pillar 120.

The fourth wirings 116 and the fifth wirings 117 may constitute a part of unillustrated circuitry provided on the side of the surface, of the second substrate 103, facing toward the first substrate 102. The circuitry may detect a change in an electric signal outputted from each thermistor element 104 and convert the detected change into a brightness temperature. The circuitry may include a readout integrated circuit (ROIC), a regulator, an analog-to-digital converter (A/D converter), a multiplexer, and other components. The readout integrated circuit may include an operational amplifier.

In the electromagnetic wave sensor 100A according to the present example embodiment having the above-described configuration, the infrared rays IR (i.e., the electromagnetic waves targeted for detection) outputted from the measurement target may enter the thermistor element 104 from the first substrate 102 side. In the example embodiment illustrated in FIGS. 12 to 15, the infrared rays IR (i.e., the electromagnetic waves targeted for detection) outputted from the measurement target may pass through the window W from the first substrate 102 side and enter the thermistor element 104.

In the thermistor element 104, the infrared rays IR having entered the insulating film 106 provided near the thermistor film 105 may be absorbed by the insulating film 106, and the infrared rays IR having entered the thermistor film 105 may be absorbed by the thermistor film 105. Such absorption of the infrared rays IR causes a change in temperature of the thermistor film 105. In the thermistor element 104, an electrical resistance value of the thermistor film 105 changes in response to the change in temperature of the thermistor film 105. In the electromagnetic wave sensor 100A according to the present example embodiment, the thermistor element 104 may serve as a bolometer element.

In the electromagnetic wave sensor 100A according to the present example embodiment, the infrared rays IR emitted from the measurement target may be two-dimensionally detected by the thermistor elements 104, and thereafter, an output voltage corresponding to each thermistor element 104 or each thermistor film 105 may be converted into a brightness temperature. It is thereby possible to two-dimensionally detect or capture a temperature distribution or a temperature image of the measurement target.

In the electromagnetic wave sensor 100A according to the present example embodiment, in the third direction Z described above, the second wirings 109 may be located closer to the first substrate 102 than the thermistor elements 104, and the first wirings 110 may be located farther from the first substrate 102 than thermistor elements 104.

In the electromagnetic wave sensor 100A according to the present example embodiment, the above-described configuration makes it possible to achieve space efficient expansion of the spacing between the second wiring 109 and the first wiring 110 in the third direction Z, and to thereby reduce a parasitic capacitance to be generated between the second wiring 109 and the first wiring 110.

Accordingly, with the electromagnetic wave sensor 100A according to the present example embodiment, it is possible to achieve high operation speed and high detection accuracy.

In the electromagnetic wave sensor 100A, for example, a combination of the thermistor film 105, the electrically conductive layer 107*c*, the wiring layer 107, the third pillar 113, and the fourth pillar 114 may correspond to a specific but non-limiting example of the resistor Z in each of the element array circuits 1 to 4 of the first to fourth example embodiments described above. Further, the first wiring 110 may correspond to a specific but non-limiting example of a part of the power feeding line A, and the first part P110 may correspond to a specific but non-limiting example of the first part PA. Further, the second wiring 109 may correspond to a specific but non-limiting example of a part of the readout line B, and the second part P109 may correspond to a specific but non-limiting example of the second part PB. Furthermore, the operational amplifier OP of each of the element array circuits 1 to 4 of the first to fourth example embodiments described above may be included in the readout integrated circuit.

The configuration of the electromagnetic wave sensor according to an embodiment of the disclosure is not limited to the configuration of the electromagnetic wave sensor 100A according to the present example embodiment.

10. Modification Examples

Although some example embodiments of the disclosure have been described hereinabove, the disclosure is not limited to such example embodiments, and may be modified in a variety of ways.

For example, although respective illustrations of the element array circuits 1 to 4 of the foregoing first to fourth example embodiments in the drawings each exemplify a case in which the respective first parts of the first wirings extend in parallel to each other, embodiments of the disclosure are not limited thereto. In some embodiments, the first parts may be non-parallel to each other. Further, each of the first wirings does not necessarily have to extend linearly, and may extend in a curved shape as a whole, or may be shaped to include a curved part or a bent part. Similarly, although the respective illustrations of the element array circuits 1 to 4 in the drawings each exemplify a case in which the respective second parts of the second wirings extend in parallel to each other, embodiments of the disclosure are not limited thereto. In some embodiments, the second parts may be non-parallel to each other. Further, embodiments of the disclosure are not limited to a case in which the first parts and the second parts extend in directions orthogonal to each other. Moreover, each of the second wirings does not necessarily have to extend linearly, and may extend in a curved shape as a whole, or may be shaped to include a curved part or a bent part.

Figure 17:
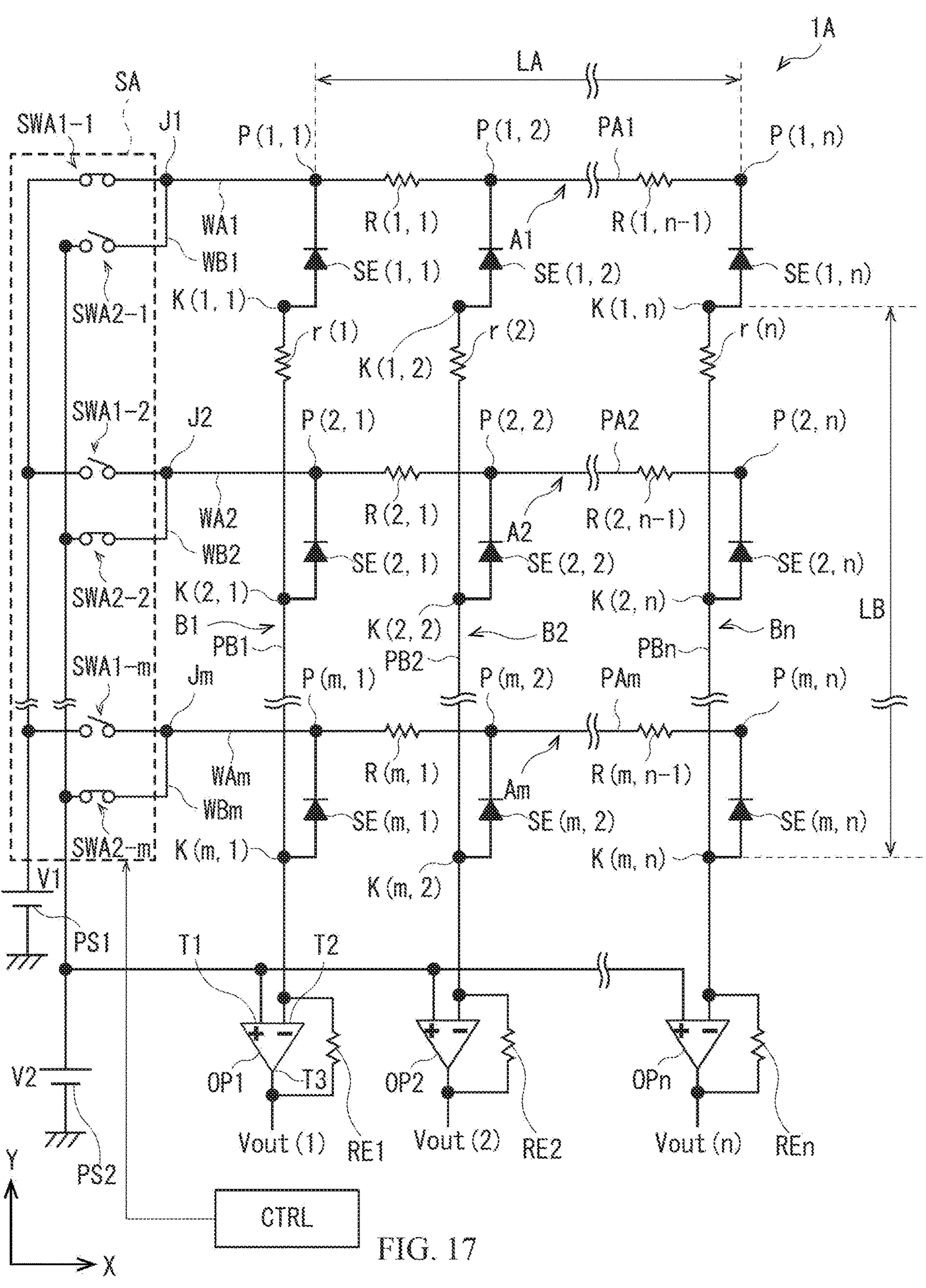
FIG. 17 is a circuit diagram illustrating a configuration example of an element array circuit according to a first modification example of one example embodiment of the disclosure.

The element array circuits 1 to 5 of the foregoing first to fifth example embodiments may each include the resistors Z as impedance elements; however, embodiments of the disclosure are not limited thereto. For example, an element array circuit 1A illustrated in FIG. 17 may include semiconductor elements SE. The element array circuit 1A may have a configuration substantially the same as the configuration of the element array circuit 1, except that the semiconductor elements SE are provided instead of the resistors Z. The semiconductor element SE may have an electrical property that changes with temperature, for example. Non-limiting examples of the semiconductor element SE may include a diode. For example, the thermistor film described as an example of the resistor Z in the first example embodiment may be replaced with a diode whose impedance value changes with temperature, and the temperature of the diode may be detected as an output voltage resulting from the impedance value of the diode. Such an element array circuit may be applied to an electromagnetic wave sensor that detects the intensity of electromagnetic waves such as infrared rays, or to a temperature sensor configured to detect a temperature distribution in a plane.

Figure 18:
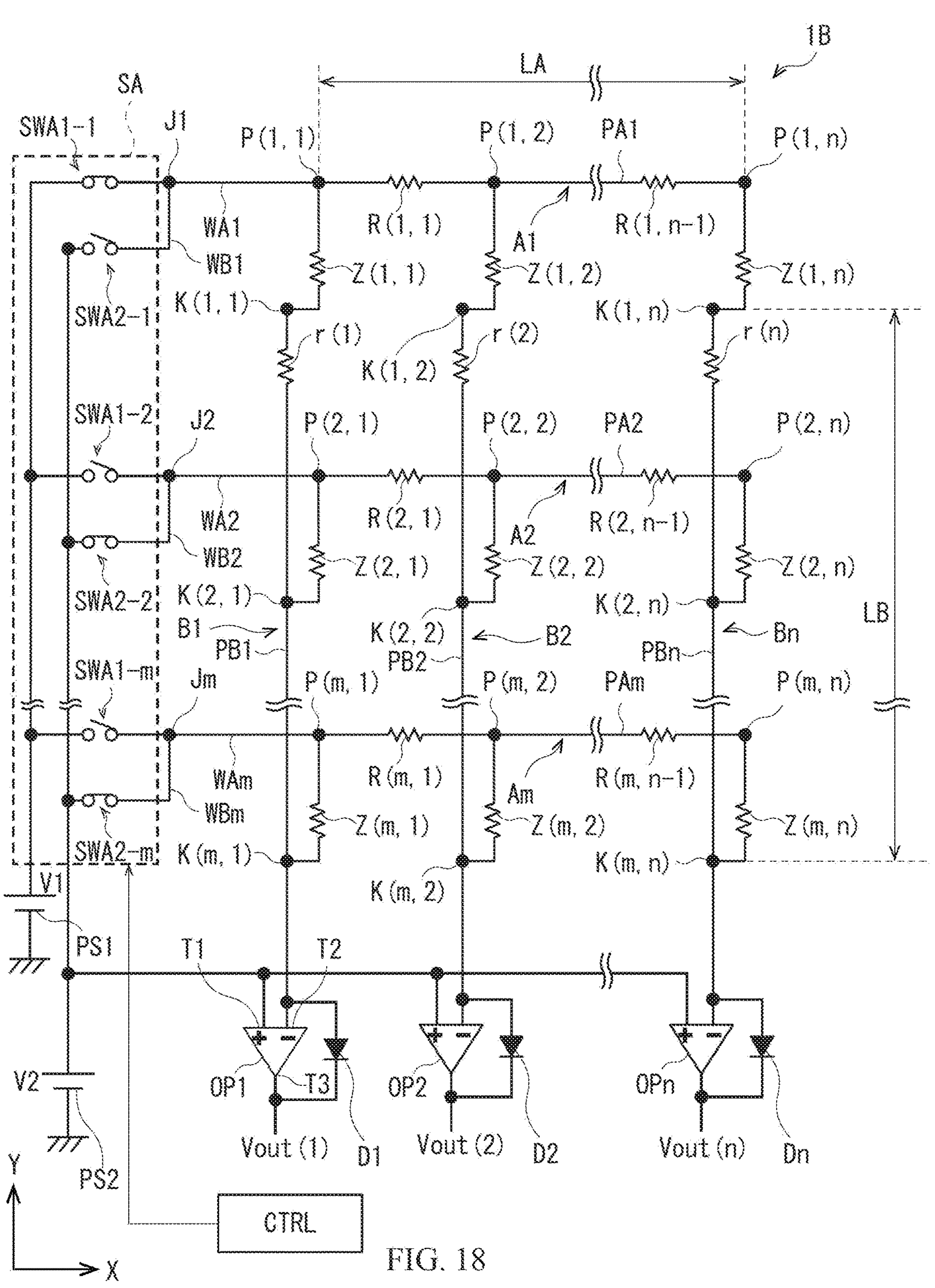
FIG. 18 is a circuit diagram illustrating a configuration example of an element array circuit according to a second modification example of one example embodiment of the disclosure.

Although the element array circuits 1 to 5 of the foregoing first to fifth example embodiments may each include the one or more resistors RE as one or more conversion elements, embodiments of the disclosure are not limited thereto. In some embodiments, one or more semiconductor elements may be employed, for example. As in an element array circuit 1B illustrated in FIG. 18, for example, diodes D may be provided as conversion elements. In an example embodiment illustrated in FIG. 18, currents dependent on the respective electrical resistance values of the resistors Z(1, 1) to Z(1, n) may flow through the respective resistors Z(1, 1) to Z(1, n), flow through the respective readout lines B1 to Bn, and flow through respective diodes D1 to Dn. The currents flowing through the respective readout lines B1 to Bn may be converted by the respective diodes D1 to Dn into voltages in accordance with respective current-voltage characteristics of the diodes D1 to Dn, and may be outputted as the output voltages Vout from the output terminals T3 of the operational amplifiers OP1 to OPn corresponding to the respective resistors Z(1, 1) to Z(1, n).

Figure 19:
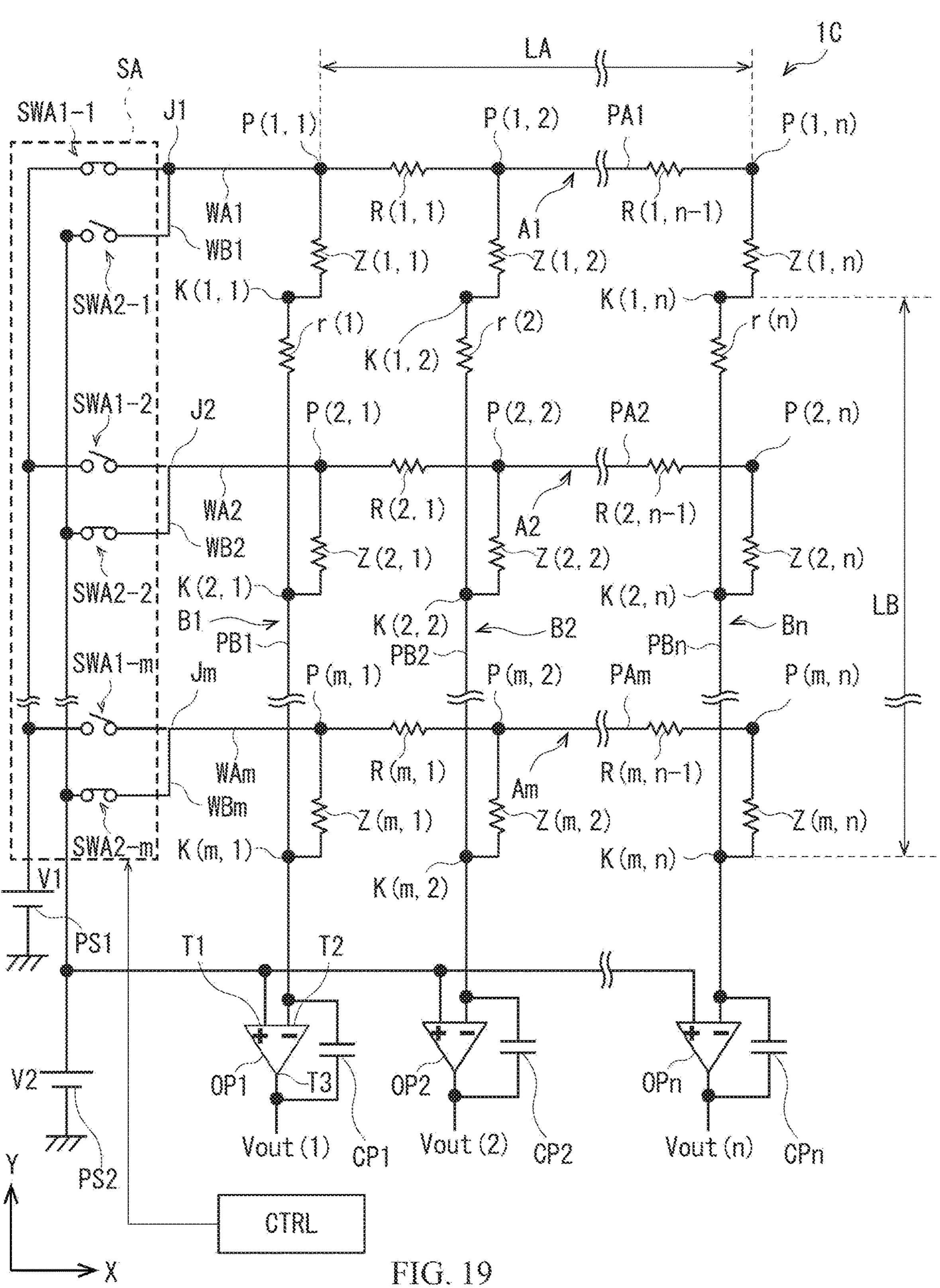
FIG. 19 is a circuit diagram illustrating a configuration example of an element array circuit according to a third modification example of one example embodiment of the disclosure.

Alternatively, as in an element array circuit 1C illustrated in FIG. 19, for example, one or more capacitors CP (CPI to CPn) may be employed as the one or more conversion elements.

Although the ninth example embodiment described above exemplifies a case in which the impedance element may be a light receiving element that converts electromagnetic waves such as infrared rays into an electric signal; however, the sensor device according to the present example embodiment is not limited to such a kind of device.

For example, a temperature-sensitive resistor element including, for example, a thermistor material or a temperature-sensitive electrically conductive ink material may be employed as the impedance element of the element array circuit. Such a temperature-sensitive resistor element may change in electrical resistance value with changing temperature. In such a case, the sensor device may serve as a temperature sensor configured to detect a temperature distribution in a plane.

Alternatively, a pressure-sensitive element including, for example, a pressure-sensitive electrically conductive ink material may be employed as the impedance element of the element array circuit. Such a pressure-sensitive element may change in electrical resistance value with changing magnitude of an applied pressure. The sensor device including the pressure-sensitive element as the impedance element may serve as a pressure sensor configured to detect a pressure distribution in a plane.

Alternatively, a strain gauge may be employed as the impedance element of the element array circuit. The strain gauge may change in electrical resistance value with changing magnitude of an applied stress. The sensor device including the strain gauge as the impedance element may serve as a strain sensor configured to detect a stress distribution in a plane.

Furthermore, the disclosure encompasses any possible combination of some or all of the various embodiments and the modification examples described herein and incorporated herein.

It is possible to achieve at least the following configurations from the foregoing example embodiments and modification examples of the disclosure.

(1)

An element array circuit including:

first wirings each including a first part;

second wirings each including a second part, the respective second parts of the second wirings each extending in a direction different from a direction in which the respective first parts of the first wirings each extend; and impedance elements each coupled to both one of the first wirings and one of the second wirings, in which each of the second wirings includes a readout line through which signals flow, the signals indicating respective states of multiple ones of the impedance elements coupled to relevant one of the second wirings, each of the first parts is a part, of relevant one of the first wirings, to which multiple ones of the impedance elements are coupled, each of the second parts is a part, of relevant one of the second wirings, to which multiple ones of the impedance elements are coupled, and each of the first parts has an electrical resistance value per unit length smaller than an electrical resistance value per unit length of each of the second parts.

(2)

The element array circuit according to (1), further including one or more operational amplifiers each including a positive input terminal, a negative input terminal, and an output terminal, the negative input terminal being couplable to one of the second wirings, in which the element array circuit is configured to allow a voltage having a value different from a value of a voltage applied to the first part of one selected first wiring to be applied to both the first part of an unselected first wiring and the positive input terminal of each of the one or more operational amplifiers, the one selected first wiring being selected from among the first wirings, the unselected first wiring being other than the one selected first wiring among the first wirings.

(3)

The element array circuit according to (2), further including a first wiring selector configured to select one of the first wirings to be the one selected first wiring.

(4)

The element array circuit according to (2), further including one or more conversion elements each coupled to the negative input terminal and the output terminal of corresponding one of the one or more operational amplifiers, and each configured to convert a current flowing through one of the second wirings that is coupled to the negative input terminal into a voltage.

(5)

The element array circuit according to (1), in which the second wirings are smaller in number than the first wirings.

(6)

An element array circuit unit including a plurality of the element array circuits according to (1), the element array circuits being disposed side by side in the direction in which the first parts each extend.

(7)

The element array circuit unit according to (6), further including:

one operational amplifier including a positive input terminal, a negative input terminal, and an output terminal, the negative input terminal being couplable to one of the second wirings included in the element array circuits; and one second wiring selector configured to select one of the second wirings included in the element array circuits to be one selected second wiring, and configured to couple the one selected second wiring to the negative input terminal, in which each of the element array circuits is configured to allow a voltage having a value different from a value of a voltage applied to one selected first wiring to be applied to both an unselected first wiring and the positive input terminal of the one operational amplifier, the one selected first wiring being selected from among the first wirings, the unselected first wiring being other than the one selected first wiring among the first wirings.

(8)

An electromagnetic wave sensor including the element array circuit according to any one of (1) to (5).

(9)

An electromagnetic wave sensor including the element array circuit unit according to (6) or (7).

(10)

A temperature sensor including the element array circuit according to any one of (1) to (5).

(11)

A temperature sensor including the element array circuit unit according to (6) or (7).

(12)

A strain sensor including the element array circuit according to any one of (1) to (5).

(13) A strain sensor including the element array circuit unit according to (6) or (7).

In an element array circuit, an element array circuit unit, an electromagnetic wave sensor, a temperature sensor, and a strain sensor according to at least one embodiment of the disclosure, each of first parts of first wirings has an electrical resistance value per unit length smaller than an electrical resistance value per unit length of each of second parts of second wirings. This reduces a voltage drop resulting from a resistance of each of the first parts. In other words, a reduced difference results between respective voltages applied to impedance elements coupled to each of the first wirings. Accordingly, an error of a measured value resulting from respective impedances of the impedance elements is reduced.

The element array circuit, the element array circuit unit, the electromagnetic wave sensor, the temperature sensor, and the strain sensor according to at least one embodiment of the disclosure each make it possible to acquire a measured value with high accuracy.

The effects described herein are mere examples and non-limiting, and other effects may be achieved.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. An element array circuit comprising:

first wirings each including a first part;

second wirings each including a second part, the respective second parts of the second wirings each extending in a direction different from a direction in which the respective first parts of the first wirings each extend; and impedance elements each coupled to both one of the first wirings and one of the second wirings, wherein each of the second wirings comprises a readout line through which signals flow, the signals indicating respective states of multiple ones of the impedance elements coupled to relevant one of the second wirings, each of the first parts is a part, of relevant one of the first wirings, to which multiple ones of the impedance elements are coupled, each of the second parts is a part, of relevant one of the second wirings, to which multiple ones of the impedance elements are coupled, and each of the first parts has an electrical resistance value per unit length smaller than an electrical resistance value per unit length of each of the second parts.

2. The element array circuit according to claim 1, further comprising one or more operational amplifiers each including a positive input terminal, a negative input terminal, and an output terminal, the negative input terminal being couplable to one of the second wirings, wherein the element array circuit is configured to allow a voltage having a value different from a value of a voltage applied to the first part of one selected first wiring to be applied to both the first part of an unselected first wiring and the positive input terminal of each of the one or more operational amplifiers, the one selected first wiring being selected from among the first wirings, the unselected first wiring being other than the one selected first wiring among the first wirings.

3. The element array circuit according to claim 2, further comprising a first wiring selector configured to select one of the first wirings to be the one selected first wiring.

4. The element array circuit according to claim 2, further comprising one or more conversion elements each coupled to the negative input terminal and the output terminal of corresponding one of the one or more operational amplifiers, and each configured to convert a current flowing through one of the second wirings that is coupled to the negative input terminal into a voltage.

5. The element array circuit according to claim 1, wherein the second wirings are smaller in number than the first wirings.

6. An element array circuit unit comprising a plurality of the element array circuits according to claim 1, the element array circuits being disposed side by side in the direction in which the first parts each extend.

7. An electromagnetic wave sensor comprising the element array circuit according to claim 1.

8. A temperature sensor comprising the element array circuit according to claim 1.

9. A strain sensor comprising the element array circuit according to claim 1.

10. The element array circuit unit according to claim 6, further comprising:

one operational amplifier including a positive input terminal, a negative input terminal, and an output terminal, the negative input terminal being couplable to one of the second wirings included in the element array circuits; and one second wiring selector configured to select one of the second wirings included in the element array circuits to be one selected second wiring, and configured to couple the one selected second wiring to the negative input terminal, wherein each of the element array circuits is configured to allow a voltage having a value different from a value of a voltage applied to one selected first wiring to be applied to both an unselected first wiring and the positive input terminal of the one operational amplifier, the one selected first wiring being selected from among the first wirings, the unselected first wiring being other than the one selected first wiring among the first wirings.

11. An electromagnetic wave sensor comprising the element array circuit unit according to claim 6.

12. A temperature sensor comprising the element array circuit unit according to claim 6.

13. A strain sensor comprising the element array circuit unit according to claim 6.

* * * * *